| (12) United States Patent | (10) Patent No.: US 11,979,360 B2 |
| Zhou | (45) Date of Patent: May 7, 2024 |

(54) MULTI-PHRASE RESPONDING IN FULL DUPLEX VOICE CONVERSATION

(71) Applicant: Microsoft Technology Licensing, LLC, Redmond, WA (US)

(72) Inventor: Li Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 17/278,632

(22) PCT Filed: Oct. 25, 2018

(86) PCT No.: PCT/CN2018/111968
§ 371 (c)(1),
(2) Date: Mar. 22, 2021

(87) PCT Pub. No.: WO2020/082309
PCT Pub. Date: Apr. 30, 2020

(65) Prior Publication Data
US 2022/0038398 A1    Feb. 3, 2022

(51) Int. Cl.
*G10L 15/18* (2013.01)
*G10L 25/78* (2013.01)
*H04L 51/02* (2022.01)

(52) U.S. Cl.
CPC .............. *H04L 51/02* (2013.01); *G10L 15/18* (2013.01); *G10L 25/78* (2013.01)

(58) Field of Classification Search
None
See application file for complete search history.

(56) References Cited

U.S. PATENT DOCUMENTS 10,277,590 B2    4/2019    Chari et al.
10,304,013 B2    5/2019    Shafiulla et al.
(Continued)

FOREIGN PATENT DOCUMENTS

CN    101169684 A    4/2008
CN    103292437 A    9/2013
(Continued)

OTHER PUBLICATIONS

"Extended Search Report Issued in European Patent Application No. 18937825.0", dated May 16, 2022, 8 Pages.
(Continued)

*Primary Examiner* — Richa Sonifrank
(74) *Attorney, Agent, or Firm* — Schwegman Lundberg & Woessner, P.A.

(57) ABSTRACT

The present disclosure provides method and apparatus for responding in a voice conversation by an electronic conversational agent. A voice input may be received in an audio upstream. In response to the voice input, a primary response and at least one supplementary response may be generated. A primary voice output may be generated based on the primary response. At least one supplementary voice output may be generated based on the at least one supplementary response. The primary voice output and the at least one supplementary voice output may be provided in an audio downstream, wherein the at least one supplementary voice output is provided during a time period adjacent to the primary voice output in the audio downstream.

17 Claims, 13 Drawing Sheets

(56) References Cited

U.S. PATENT DOCUMENTS

| | | | |
|---|---|---|---|
| 2005/0288930 | A1 | 12/2005 | Shaw et al. |
| 2012/0179473 | A1* | 7/2012 | Yano ........................ G10L 15/22 |
| | | | 704/E21.001 |
| 2015/0206531 | A1 | 7/2015 | Fujisawa |
| 2016/0110347 | A1* | 4/2016 | Kennewick, Jr. ....... G10L 15/18 |
| | | | 704/9 |
| 2016/0148610 | A1* | 5/2016 | Kennewick, Jr. ....... G10L 15/18 |
| | | | 704/240 |
| 2017/0357636 | A1 | 12/2017 | Shafiulla et al. |
| 2018/0182398 | A1* | 6/2018 | Halstvedt ............ G06F 16/3329 |
| 2018/0205726 | A1 | 7/2018 | Chari et al. |
| 2018/0366116 | A1* | 12/2018 | Nicholson ............... G10L 15/22 |
| 2019/0362718 | A1* | 11/2019 | Bhargava ................ G10L 15/22 |

FOREIGN PATENT DOCUMENTS

| | | |
|---|---|---|
| CN | 105027197 A | 11/2015 |
| CN | 107003999 A | 8/2017 |
| CN | 107111611 A | 8/2017 |
| CN | 108228131 A | 6/2018 |
| CN | 108630203 A | 10/2018 |
| CN | 108701458 A | 10/2018 |
| CN | 109994108 A | 7/2019 |
| EP | 3340241 A1 | 6/2018 |

OTHER PUBLICATIONS

"International Search Report and Written Opinion issued in PCT Application No. PCT/CN18/111968", dated Jul. 24, 2019, 8 Pages.
"Office Action and Search Report Issued in Chinese Patent Application No. 201880085943.5", dated Dec. 19, 2022, 7 Pages.
"Notice of Allowance Issued in Chinese Patent Application No. 201880085943.5", dated Jun. 29, 2023, 8 Pages.
Communication 94(3) Received for European Application No. 18937825, mailed on Nov. 16, 2023, 6 pages.

* cited by examiner

MULTI-PHRASE RESPONDING IN FULL DUPLEX VOICE CONVERSATION

CROSS-REFERENCE TO RELATED APPLICATION

This application is a U.S. National Stage Filing under 35 U.S.C. 371 of International Patent Application Serial No. PCT/CN2018/111968, filed Oct. 25, 2018, and published as WO 2020/082309 A1 on Apr. 30, 2020, which applications and publication are incorporated herein by reference in their entirety.

BACKGROUND

Electronic conversational agent, e.g., Artificial Intelligence (AI) chatbot, is becoming more and more popular, and is being applied in an increasing number of scenarios. The chatbot may be implemented in, e.g., instant messenger, social network, smartphone personal assistant, wearable device, IoT smart device, etc. Besides chatting via text, the chatbot may also chat with users via voice. In some implementations, the chatbot is designed to conduct a full duplex voice conversation with the users so as to achieve more complex interactive behaviors.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for responding in a voice conversation by an electronic conversational agent. A voice input may be received in an audio upstream. In response to the voice input, a primary response and at least one supplementary response may be generated. A primary voice output may be generated based on the primary response. At least one supplementary voice output may be generated based on the at least one supplementary response. The primary voice output and the at least one supplementary voice output may be provided in an audio downstream, wherein the at least one supplementary voice output is provided during a time period adjacent to the primary voice output in the audio downstream.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
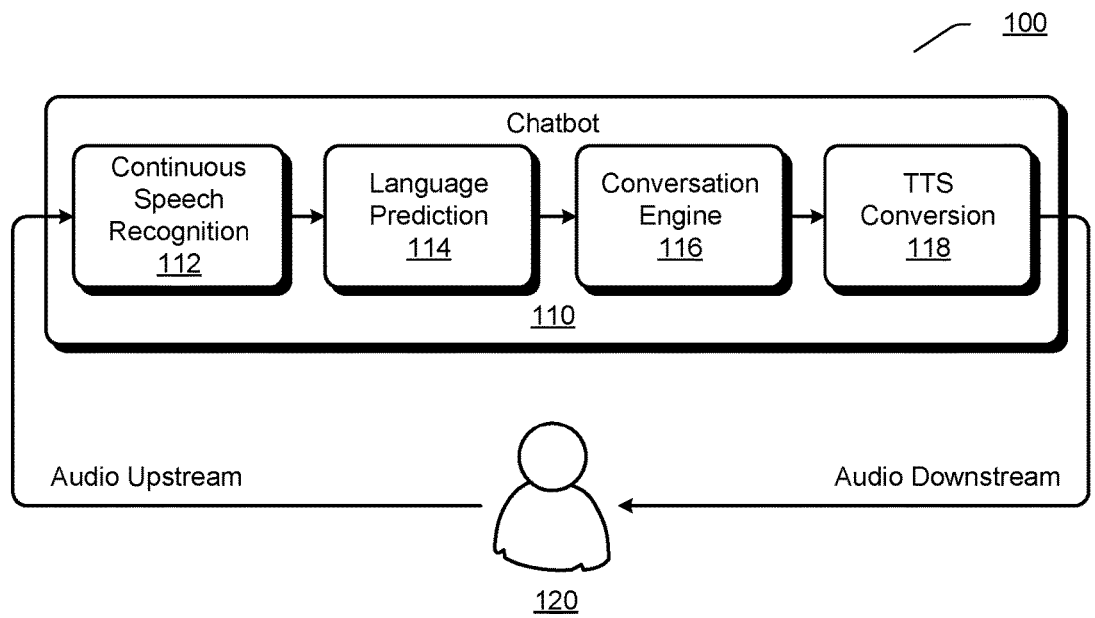
FIG. 1 illustrates an exemplary application scenario of a full duplex voice conversation.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Usually, during a full duplex voice conversation between a chatbot and a user, the chatbot maintains two timely-synchronized audio streams: one continuous audio upstream for receiving the user's voice inputs, and another continuous audio downstream for providing voice outputs generated by the chatbot. Accordingly, the chatbot and the user may have simultaneous and bidirectional communications with each other. Through recognizing voice information in a voice input in the audio upstream in real time, the chatbot may start to prepare voice outputs to be provided in the audio downstream, even when the user has not finished the voice input. The full duplex voice conversation enables the chatbot to generate responses and provide voice outputs more quickly.

After receiving a message input by a user, a traditional chatbot only provides one single response to the message. That is, during a conversation between the chatbot and the user, the chatbot provides responses in a 1:1 parity interaction mode. However, when applying a full duplex voice conversation in practice, its simultaneous and bidirectional fashions of communication sometimes require more complex non-parity interaction modes rather than the 1:1 parity interaction mode. For example, when two humans are talking with each other over a telephone or face to face, their conversation doesn't have to be kept in 1:1 parity. One party may talk more while the other party may listen more and talk less. Also, it is very common for a human to speak a short acknowledge or phrase firstly, and later supplement with more detailed contents after thinking over carefully. It would be helpful to improve user experience of a chatbot if the chatbot may work in a manner similar with the human-to-human conversations as mentioned above.

Embodiments of the present disclosure propose a multi-phrase response mechanism for a chatbot to respond in a voice conversation, wherein the voice conversation may be any types of voice conversation that are based on audio streams, such as, a full duplex voice conversation. Herein, the multi-phrase response mechanism may refer to responding to a single voice input, through generating more than one response, e.g., a primary response and at least one supplementary response, and accordingly providing more than one voice output, e.g., a primary voice output and at least one supplementary voice output. The primary response may be a direct response to the voice input, e.g., an answer to a question in the voice input. While the at least one supplementary response may be an addition or supplementation to the primary response, and intends for filling an idle time period during which the primary response and the primary voice output are prepared or during which no further valid voice input is received, in order to make the voice conversation more smoothly and make the chatbot's behaviors more anthropomorphic. Through the multi-phrase response mechanism, when receiving a voice input from a user in an audio upstream, the chatbot may, in response to the voice input, generate a primary response and at least one supplementary response. The chatbot may provide at least one supplementary voice output corresponding to the at least one supplementary response in an audio downstream before or after providing a primary voice output corresponding to the primary response. For example, the at least one supplementary voice output may be provided during a time period adjacent to the primary voice output in the audio downstream.

Through providing the supplementary voice output before the primary voice output, the latency that the user feels may be shortened. Through providing the supplementary voice output after the primary voice output, non-parity experience of the voice conversation may be optimized. Accordingly, the embodiments of the present disclosure could make a voice conversation between the chatbot and the user more natural and closer to human-to-human conversations.

It should be appreciated that the term "voice conversation" used hereinafter refers to any types of voice conversation that are based on audio streams, e.g., audio upstream and/or audio downstream. Although such "voice conversation" is referred to as "full duplex voice conversation" in some paragraphs below, it may be also referred to as various other expressions, e.g., "stream-based voice conversation", "realtime voice conversation", etc., and all these expressions may be used interchangeably. Moreover, in the following discussions, the term "user" may refer to a chatting participant who is consuming an automatic chatting service provided by a chatbot, and may be a real human, or a virtual human, e.g., an electronic chatting participant.

FIG. 1 illustrates an exemplary application scenario 100 of a full duplex voice conversation. In the scenario 100, an electronic conversational agent 110, e.g., a chatbot, is performing a full duplex voice conversation with a user 120. The chatbot 110 receives voice inputs from the user 120 in a continuous audio upstream, and provides voice outputs in a continuous audio downstream.

The chatbot 110 may comprise a continuous speech recognition (CSR) module 112. Speech recognition may take an audio clip as input and a recognized text as output. The CSR module 112 may perform continuous speech recognition on the continuous audio upstream in real time, wherein the audio upstream comprises a plurality of audio clips corresponding to voice inputs from the user 120. The CSR module 112 may provide two types of text outputs, e.g., intermediate SR result and final SR result. An intermediate SR result represents a partial recognition of a part of a voice input, e.g., a part of a sentence spoken by the user, which is usually yielded after each new syllable, character, word, or phrase, etc. is spoken. A final SR result represents a complete recognition of the voice input after the user 120 has finished the voice input, e.g., a whole sentence is spoken. Thus, each sentence spoken by the user 120 may yield a plurality of intermediate SR results and one final SR result.

The chatbot 110 may comprise a language prediction (LP) module 114 which tries to predict a whole text of the user's voice input based on an intermediate SR result from the CSR module 112. For example, the LP module 114 may try to complement a part of a sentence with possible remaining parts so as to make the sentence complete, thus enabling the chatbot 110 to "start thinking" even before the user 120 finishes the whole voice input.

The chatbot 110 may comprise a conversation engine (CE) module 116. Traditional conversation engine may be applied for generating a chatbot's text response based on a text input from a user. The CE module 116 may take either a language-predicted text sentence from an intermediate SR result, or a whole text sentence from the final SR result as input, and generate corresponding candidates of text response as output.

The chatbot 110 may comprise a text-to-speech (TTS) conversion module 118 which may convert a text response generated by the CE module 116 into a voice output, e.g., at least one audio clip. The audio clip generated by the TTS conversion module 118 may be provided as voice output to the user 120 in the audio downstream.

In the scenario 100, since the chatbot 110 may perform continuous speech recognition on the voice input from the user 120, the chatbot 110 may establish a single processing thread for each of the intermediate SR results and the final SR result obtained by the CSR module 112. Each thread calls the LP module 114, the CE module 116 and the TTS conversion module 118 so as to generate a candidate voice output by this thread. In other words, the chatbot 110 maintains one or more threads in parallel during processing the voice input. Considering that the intermediate SR results are obtained earlier than the final SR result, those threads corresponding to the intermediate SR results would also generate candidate voice outputs earlier than the thread corresponding to the final SR result. Thus, if it is determined that a LP result in a certain thread matches the final SR result, i.e., the LP module 114 makes a correct prediction based on the intermediate SR result in this thread, a candidate voice output by this thread may be selected as a final voice output to be provided to the user 120. Through this way, the chatbot 110 may provide a voice output to the user 120 more quickly, without the need of waiting for a processing result of the thread corresponding to the final SR result.

It should be appreciated that all the modules in the chatbot 110 as mentioned above are exemplary, and depending on specific application designs and requirements, more or less modules may be included in the chatbot 110. Moreover, various existing techniques or approaches may be adopted for implementing each of the modules in the chatbot 110.

Figure 2:
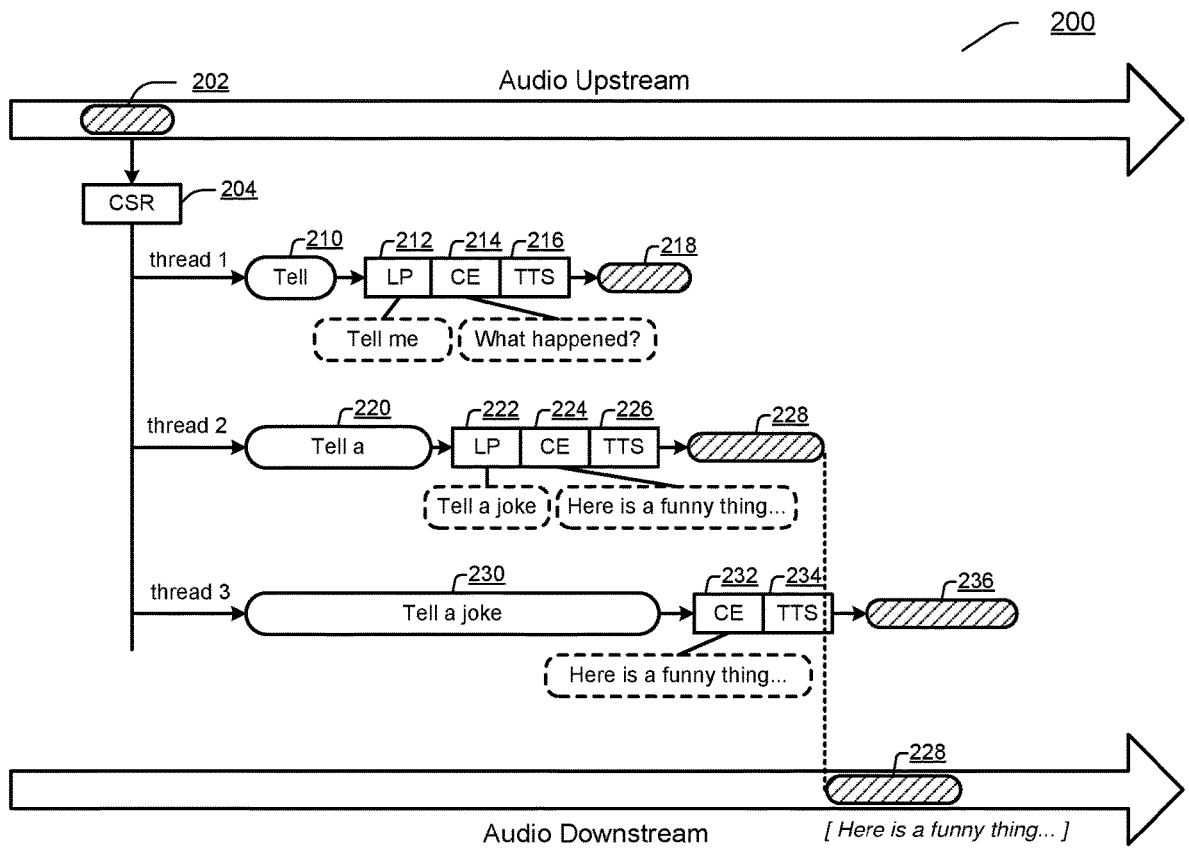
FIG. 2 illustrates an exemplary processing flow for responding in a full duplex voice conversation.

FIG. 2 illustrates an exemplary processing flow 200 for responding in a full duplex voice conversation. The processing flow 200 may be based on the application scenario 100 shown in FIG. 1.

A voice input 202 from a user may be occurring in an audio upstream. It is assumed that the user intends to speak a sentence "Tell a joke" in the voice input 202.

At 204, continuous speech recognition (CSR) may be performed on the voice input 202 during receiving the voice input 202 in the audio upstream.

Assuming that an intermediate SR result 210, i.e., a word "Tell", is firstly obtained by the CSR, then a thread 1 may be established for this intermediate SR result 210. In the thread 1, at 212, language prediction (LP) is made based on the intermediate SR result 210. For example, a LP result "Tell me" may be generated based on the intermediate SR result "Tell". Then, at 214, a conversation engine (CE) may be used for generating a text response based on the LP result. For example, a text response "What happened?" may be generated based on the LP result "Tell me". At 216, text-to-speech (TTS) conversion may be performed on the text response obtained at 214, so as to generate a candidate voice output 218 which is an audio clip corresponding to the text response "What happened?".

Assuming that an intermediate SR result 220, i.e., a phrase "Tell a", is further obtained by the CSR, then a thread 2 may be established for this intermediate SR result 220. In the thread 2, at 222, a LP result "Tell a joke" may be generated based on the intermediate SR result "Tell a". Then, a text response "Here is a funny thing . . . " may be generated by the CE at 224 based on the LP result "Tell a joke". The text response "Here is a funny thing . . . " is further used for generating a candidate voice output 228 through the TTS at 226.

Assuming that a final SR result 230, i.e., a sentence "Tell a joke", is further obtained by the CSR, then a thread 3 may be established for this final SR result 230. In the thread 3, a text response "Here is a funny thing . . . " may be generated by the CE at 232 based on the final SR result "Tell a joke". The text response "Here is a funny thing . . . " is further used for generating a candidate voice output 236 through the TTS at 234.

The thread 1, thread 2 and thread 3 in FIG. 2 are established sequentially along with the user is speaking more words in the voice input 202. Accordingly, these threads may generate candidate voice outputs in different time points. For example, the candidate voice output 218 may be obtained earlier than the candidate voice output 228, and the candidate voice output 228 may be obtained earlier than the candidate voice output 236, etc.

In an implementation, after obtaining the final SR result 230, a matching between this final SR result 230 and those LP results in other threads may be performed so as to determine which thread is based on a correct prediction of the voice input 202. For example, in the example of FIG. 2, it may be determined that the LP result "Tell a joke" obtained at 222 in the thread 2 matches with the final SR result 230. Accordingly, the candidate voice output 228 by the thread 2 may be provided as a final voice output to the user in an audio downstream. It can be seen that the candidate voice output 228 by the thread 2 is the same as the candidate voice output 236 by the thread 3 in terms of content, but is obtained earlier than the candidate voice output 236. Through providing the candidate voice output 228 in the audio downstream, rather than waiting for the generating of the candidate voice output 236, the chatbot may respond to the voice output 202 more quickly.

It should be appreciated that although the example of FIG. 2 involves three exemplary threads established based on words recognized from the voice input 202, more or less threads may be established based on at least one of syllables, characters, phrases, etc. recognized from the voice input 202. Although it is shown in FIG. 2 that each of the threads finally generates a candidate voice output, it is also possible that not each thread has generated its candidate voice output when a matched LP result is identified from these threads or when a candidate voice output corresponding to the matched LP result is provided in the audio downstream. In this case, those threads having not finished their processes may be stopped or removed immediately.

Exemplary implementations of full duplex voice conversation have been discussed above in connection with FIG. 1 and FIG. 2. It should be appreciated that the embodiments of the present disclosure discussed below are proposed not only for the exemplary implementations of the full duplex voice conversation in FIG. 1 and FIG. 2, but also for any other implementations of voice conversation that are based on audio streams.

Figure 3:
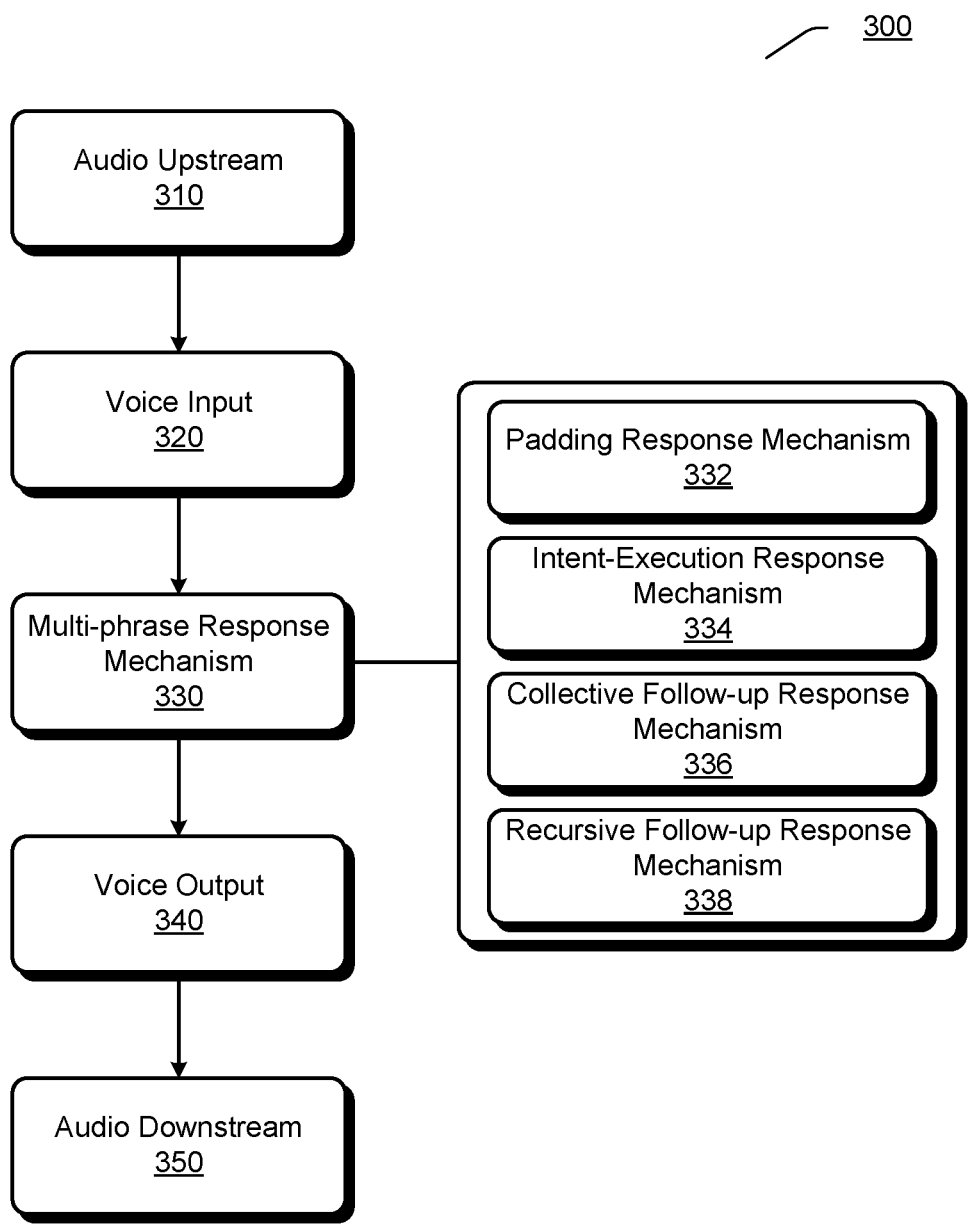
FIG. 3 illustrates an exemplary process for implementing a multi-phrase response mechanism in a voice conversation according to an embodiment.

FIG. 3 illustrates an exemplary process 300 for implementing a multi-phrase response mechanism in a voice conversation according to an embodiment.

According to the process 300, a chatbot may monitor an audio upstream 310 from a user to the chatbot. A voice input 320 by the user may be detected by the chatbot from the audio upstream 310. During receiving the voice input 320, the chatbot may apply a multi-phrase response mechanism 330, so as to generate at least one voice output 340 which is used for responding to the voice input 320. The at least one voice output 340 may comprise a primary voice output and at least one supplementary voice output. The at least one voice output 340 may be further provided to the user in an audio downstream 350 from the chatbot to the user.

The multi-phrase response mechanism 330 in FIG. 3 may collectively refer to any mechanisms for responding in a voice conversation according to the embodiments of the present disclosure. In an implementation, the multi-phrase response mechanism 330 may be a padding response mechanism 332, which will be discussed in details below in connection with FIG. 4 to FIG. 6. In an implementation, the multi-phrase response mechanism 330 may be an intent-execution response mechanism 334, which will be discussed in details below in connection with FIG. 7 to FIG. 9. In an implementation, the multi-phrase response mechanism 330 may be a collective follow-up response mechanism 336, which will be discussed in details below in connection with FIG. 10 to FIG. 12. In an implementation, the multi-phrase response mechanism 330 may be a recursive follow-up response mechanism 338, which will be discussed in details below in connection with FIG. 13 to FIG. 15.

It should be appreciated that although various multi-phrase response mechanisms are discussed below separately, any of these mechanisms may be combined together according to specific application designs and requirements.

In some cases, although humans may listen, think and speak in a very time-efficient manner, when the humans talk with each other during a conversation, it is still impossible to provide every reply immediately after the other party has spoken a sentence. In order to let the other party know that he or she has started thinking about the reply, it is a common practice to speak one or more padding words, e.g., "hmm", "well", "let me think", etc., before giving the final reply. Such conversation practice in human's conversation also plays an important role for the design of a chatbot so as to enable the chatbot to keep the rhythm of a voice conversation between the chatbot and a user. Through responding by padding words as an early acknowledgement during the chatbot is preparing the final response, the chatbot may let the user know that his voice input is not missed, thus avoiding unnecessary repetition of the voice input by the user. Since the padding words are just a few predetermined and fixed expression paradigms contextually independent from content in the user's voice input, it is relatively easy for the chatbot to provide an extra voice output based on the padding words immediately after the user's voice input, thus shortening the latency that the user feels before hearing the final voice output provided by the chatbot.

The embodiments of the present disclosure propose a padding response mechanism, which may be configured for, in response to a user's voice input, providing at least one supplementary voice output before a primary voice output is provided, wherein the at least one supplementary voice output is generated based on at least one padding word, and the primary voice output includes content being as a direct and substantial reply to the user's voice input. Herein, the term "word" may refer to one or more words, phrases, characters, etc.

Figure 4:
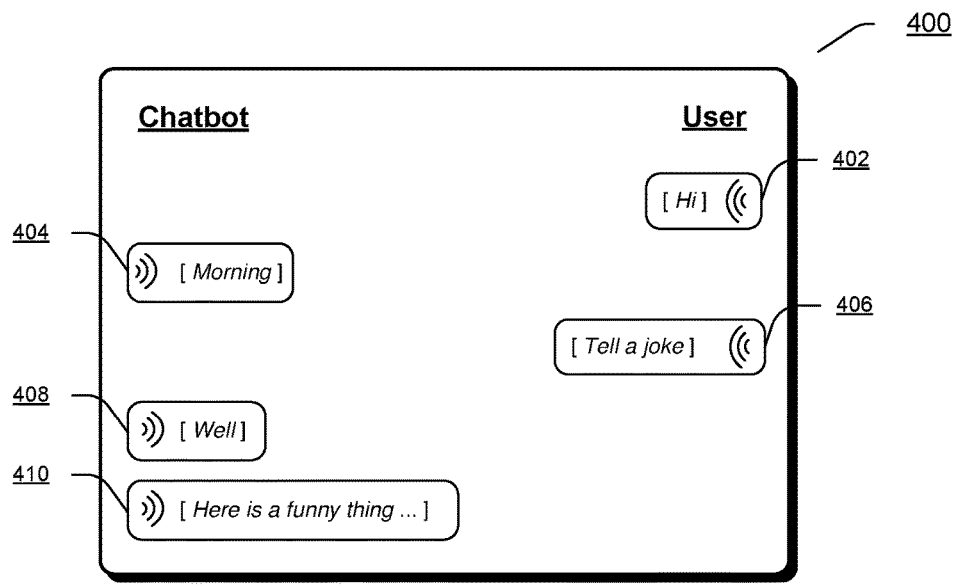
FIG. 4 illustrates an exemplary voice conversation according to an embodiment.

FIG. 4 illustrates an exemplary voice conversation 400 according to an embodiment. The voice conversation 400 may be based on, e.g., the padding response mechanism. The voice conversation 400 is schematically shown in a chat window between a chatbot and a user.

The user may provide a voice input 402, e.g., "Hi", in an audio upstream. The chatbot may respond by a voice output 404, e.g., "Morning", in an audio downstream.

The user may further provide a voice input 406, e.g., "Tell a joke", in the audio upstream. During receiving the voice input 406, the chatbot may apply the padding response mechanism. Through the padding response mechanism, the chatbot may firstly provide a supplementary voice output 408, e.g., "Well", and then provide a primary voice output 410, e.g., "Here is a funny thing . . . ". The supplementary voice output 408 is generated based at least on the padding word "Well", and is provided in the audio downstream during the chatbot is preparing the primary voice output 410.

It should be appreciated that the chat window in FIG. 4 is exemplary, and depending on specific application requirements, the chat window may be changed in various manners in terms of layout, elements being incorporated, etc. Moreover, although the voice conversation 400 is presented in the visual chat window, the visual chat window may also be omitted in some cases that the chatbot is implemented in a smart device without or disabling display functions, e.g., an intelligent speaker without a display screen.

Figure 5:
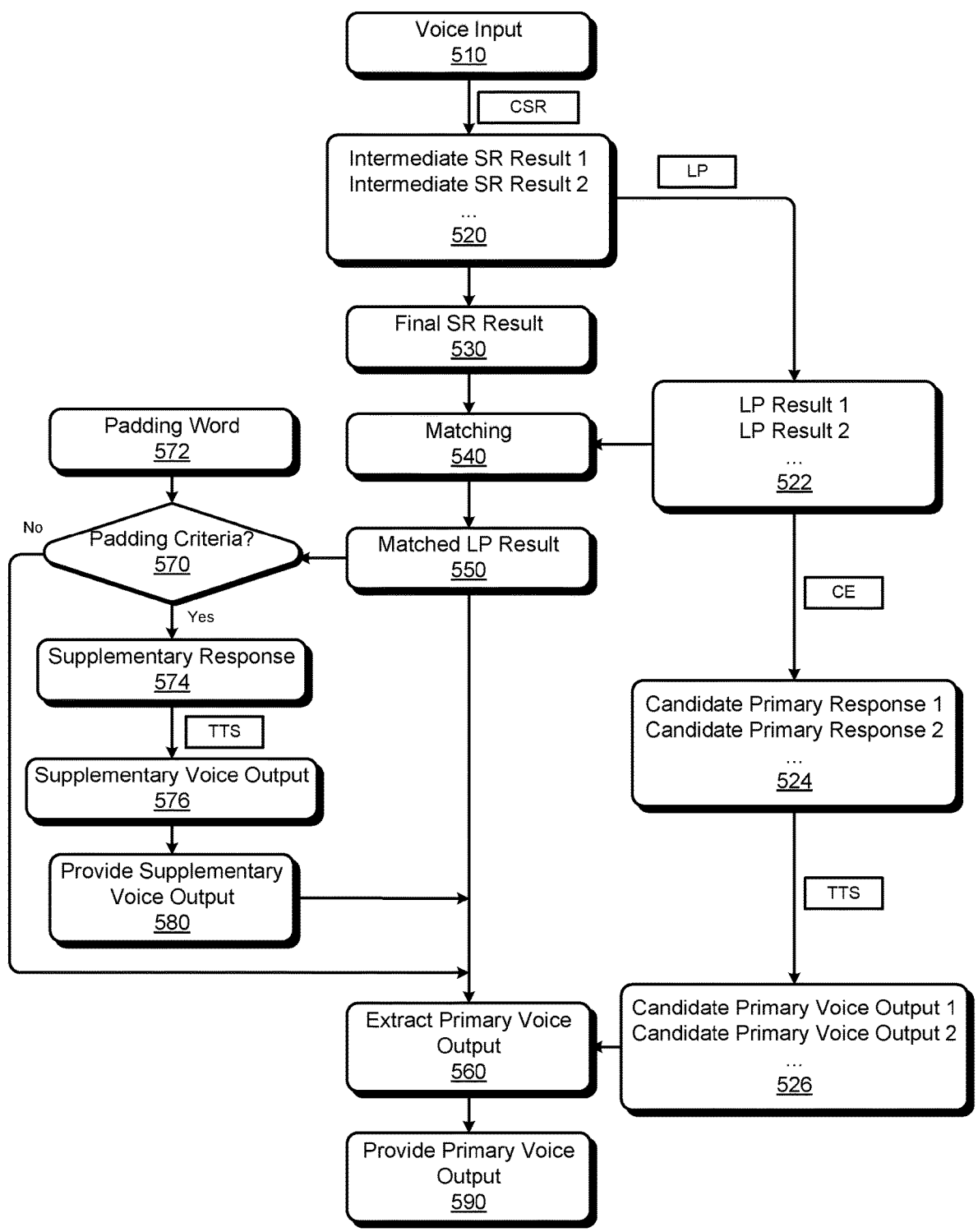
FIG. 5 illustrates an exemplary method for responding in a voice conversation according to an embodiment.

FIG. 5 illustrates an exemplary method 500 for responding in a voice conversation according to an embodiment. The method 500 may be an exemplary implementation of the padding response mechanism.

A voice input 510 may be received by a chatbot from a user in an audio upstream in the voice conversation between the chatbot and the user.

During receiving the voice input 510, the chatbot may perform continuous speech recognition (CSR) on the voice input 510. Through the CSR, at least one intermediate SR result 520 may be obtained, e.g., intermediate SR result 1, intermediate SR result 2, etc.

As mentioned above, for each intermediate SR result, a thread may be established. In each thread, language prediction (LP) may be performed on the corresponding intermediate SR result so as to generate a LP result which may be deemed as a prediction of the voice input 510. Accordingly, at least one LP result 522 may be generated in the method 500, e.g., LP result 1, LP result 2, etc. Taking the intermediate SR result 1 as an example, a thread 1 may be established, in which the LP result 1 may be generated through performing the LP on the intermediate SR result 1.

In each thread, conversation engine (CE) may be called for generating a candidate primary response based on the corresponding LP result. Accordingly, at least one candidate primary response 524 may be obtained in the method 500, e.g., candidate primary response 1, candidate primary response 2, etc. Taking the thread 1 as an example, the candidate primary response 1 may be generated by the CE based on the LP result 1.

In each thread, text-to-speech (TTS) conversion may be performed on the corresponding candidate primary response so as to generate a candidate primary voice output. Accordingly, at least one candidate primary voice output 526 may be generated in the method 500, e.g., candidate primary voice output 1, candidate primary voice output 2, etc. Taking the thread 1 as an example, the candidate primary voice output 1 may be generated through performing the TTS conversion on the candidate primary response 1.

Through the CSR, a final SR result 530 may be obtained, which is a SR result of the whole voice input 510.

At 540, a matching may be performed between the final SR result 530 and the at least one LP result 522, so as to find out a matched LP result 550 and accordingly find out a matched thread. The matched LP result 550 may indicate a certain thread from which a primary voice output to be provided to the user shall be obtained. In other words, the matched LP result 550 may be used for extracting, at 560, a primary voice output from the at least one candidate primary voice output 526. Assuming that the LP result 2 in a thread 2 is determined as the matched LP result 550 and accordingly the thread 2 is a matched thread, then the candidate primary voice output 2 obtained through the thread 2 may be extracted as the final primary voice output to be provided to the user.

At 590, the extracted primary voice output may be provided to the user in an audio downstream.

The method 500 may try to provide at least one supplementary voice output which is based on at least one padding word during a time period between a time point of completing the receiving of the voice input 510 and a time point of providing the primary voice output.

In one case, if the established threads work efficiently enough, it is possible that at the time point of completing the receiving of the voice input 510 or yielding the final SR result 530 by the CSR, a candidate primary voice output obtained through a matched thread is already ready for being provided to the user. In such case, any supplementary voice output generated from padding words would be never necessary, because the chatbot may provide the primary voice output directly.

Otherwise, in most cases, since the CE and TTS may take a rather long time to be performed, the matched thread may have not generated the candidate primary voice output yet at the time point of completing the receiving of the voice input 510 or yielding the final SR result 530 by the CSR, and thus there exists a chance to provide a supplementary voice output during an end-to-end latency which is between the time point of completing the receiving of the voice input 510 and the time point of providing the primary voice output. The longer the end-to-end latency could be expected by the chatbot, the more likely a supplementary voice output may be added.

In an implementation, the end-to-end latency may be calculated as CE processing time plus TTS processing time minus LP time gain, wherein the LP time gain refers to a time difference between the time point of completing the receiving of the voice input 510 and the time point of predicting a LP result through the LP. Expected CE processing time, i.e., estimation of CE processing time, depends on specific implementation of the CE, e.g., rule-based CE, search-based CE, generative approach-based CE, mixed model-based CE, etc. Expected TTS processing time, i.e., estimation of TTS processing time, depends on a length of text response that the CE yields.

According to the method 500, when the matched LP result 550 is found, the matched thread is also determined. Accordingly, it may be determined at 570 that whether criteria for providing a supplementary voice output which is based on at least one padding word 572 are met. The criteria may be established based in part on the end-to-end latency caused by the matched thread and a duration of output of the at least one padding word 572, wherein the duration of output of the at least one padding word 572 may refer to a duration of a voice output generated based on the at least one padding word 572 in an assumption that it is to generate the voice output based on the at least one padding word 572.

If the CE in the matched thread has generated a candidate primary response by the time point that the CSR yields the final SR result 530, then the end-to-end latency may be calculated as follow:

$$T^{expected} = T_{CE}^{actual} + T_{TTS}^{expected} (\text{RespLen}_{CE}^{actual}(\text{Input})) - \text{Gain}_{LP}^{actual} \quad \text{(Equation 1)}$$

where $T^{expected}$ denotes the end-to-end latency caused by the matched thread, $T_{CE}^{actual}$ denotes actual CE processing time in the matched thread, $\text{RespLen}_{CE}^{actual}(\text{Input})$ denotes an actual length of the candidate primary response generated by the CE based on the LP result in the matched thread, $T_{TTS}^{expected}$ denotes expected TTS processing time in the matched thread, and $\text{Gain}_{LP}^{actual}$ denotes an actual LP time gain in the matched thread.

Otherwise, if the CE in the matched thread has not generated a candidate primary response yet by the time point that the CSR yields the final SR result 530, an estimation of the CE processing time as well as an estimation of a length of the candidate primary response to be generated are also necessary, and then the end-to-end latency may be calculated as follow:

$$T^{expected} = T_{CE}^{expected}(\text{Input}) + T_{TTS}^{expected} (\text{RespLen}_{CE}^{expected}(\text{Input})) - \text{Gain}_{LP}^{actual} \quad \text{(Equation 2)}$$

where $T^{expected}$ denotes the end-to-end latency caused by the matched thread, $T_{CE}^{expected}(\text{Input})$ denotes expected CE processing time for the CE to generate a candidate primary response based on a LP result in the matched thread, $\text{RespLen}_{CE}^{expected}(\text{Input})$ denotes an expected length of the candidate primary response to be generated by the CE in the matched thread, $T_{TTS}^{expected}$ denotes expected TTS processing time in the matched thread, and $\text{Gain}_{LP}^{actual}$ denotes an actual LP time gain in the matched thread.

In an implementation, according to the criteria, if the duration of output of the at least one padding word 572 is within a duration of the end-to-end latency with a predetermined probability, then it may be decided that a supplementary voice output which is based on the at least one padding word 572 can be provided. The predetermined probability may be any previously-set value, e.g., 100%, 90%, 80%, etc. Assuming that the end-to-end latency conforms with, e.g., a normal distribution $N(\Xi, \sigma)$, and the duration of output of the at least one padding word 572 is K milliseconds, i.e., an audio clip generated based on the at least one padding word 572 lasts K milliseconds, then the decision may be evaluated as follow:

$$K \leq \lambda - Z\text{Table}(0.8)\sigma \quad \text{(Equation 3)}$$

It should be appreciated that the at least one padding word 572 may be determined in various approaches. For example, the at least one padding word 572 may be selected from a set of predetermined padding words randomly, selected from the set of predetermined padding words under a consideration of whether the criteria may be met, etc.

If it is determined at 570 that the criteria are met, a supplementary response 574 may be generated based on the at least one padding word 572 in various approaches. For example, the supplementary response 574 may be generated from the at least one padding word 572 directly, generated through combining the at least one padding word 572 with any other words, etc. Then, a supplementary voice output 576 may be generated through TTS based on the supplementary response 574. At 580, the supplementary voice output 576 may be provided to the user in the audio downstream. It should be appreciated that, since the process of generating and providing the supplementary voice output is usually faster than the process of generating and providing the primary voice output, the supplementary voice output may be provided in the audio downstream earlier than the primary voice output. However, during the providing of the supplementary voice output in the audio downstream, if the primary voice output gets ready to be provided, the providing of the supplementary voice output may be interrupted, and instead the providing of the primary voice output may be started in the audio downstream.

If it is determined at 570 that the criteria are not met, then the method 500 may give up the attempt of providing any supplementary voice output.

It should be appreciated that the method 500 is exemplary, and the present disclosure shall cover any additions, deletions, replacements and reordering applied to the steps in the method 500. In an implementation, instead of using padding words in the format of text, pre-recorded or cached padding audio clips may also be adopted by the method 500. In this case, the criteria involved in the decision at 570 may be based in part on the duration of a padding audio clip directly, and the padding audio clip may be provided to the user directly as a supplementary voice output, without the need of performing the steps of generating the supplementary response 574 and the supplementary voice output 576. In an implementation, although it is shown in FIG. 5 that the primary voice output is extracted at 560 from the at least one candidate primary voice output 526, it is not required that, when the extracting at 560 is performed, all the threads have already generated their respective candidate primary voice outputs or even have already generated their respective candidate primary responses. Actually, it is very possible that only few threads including the matched thread have generated candidate primary voice outputs when the extracting at 560 is performed, while other threads are still in progress.

Figure 6:
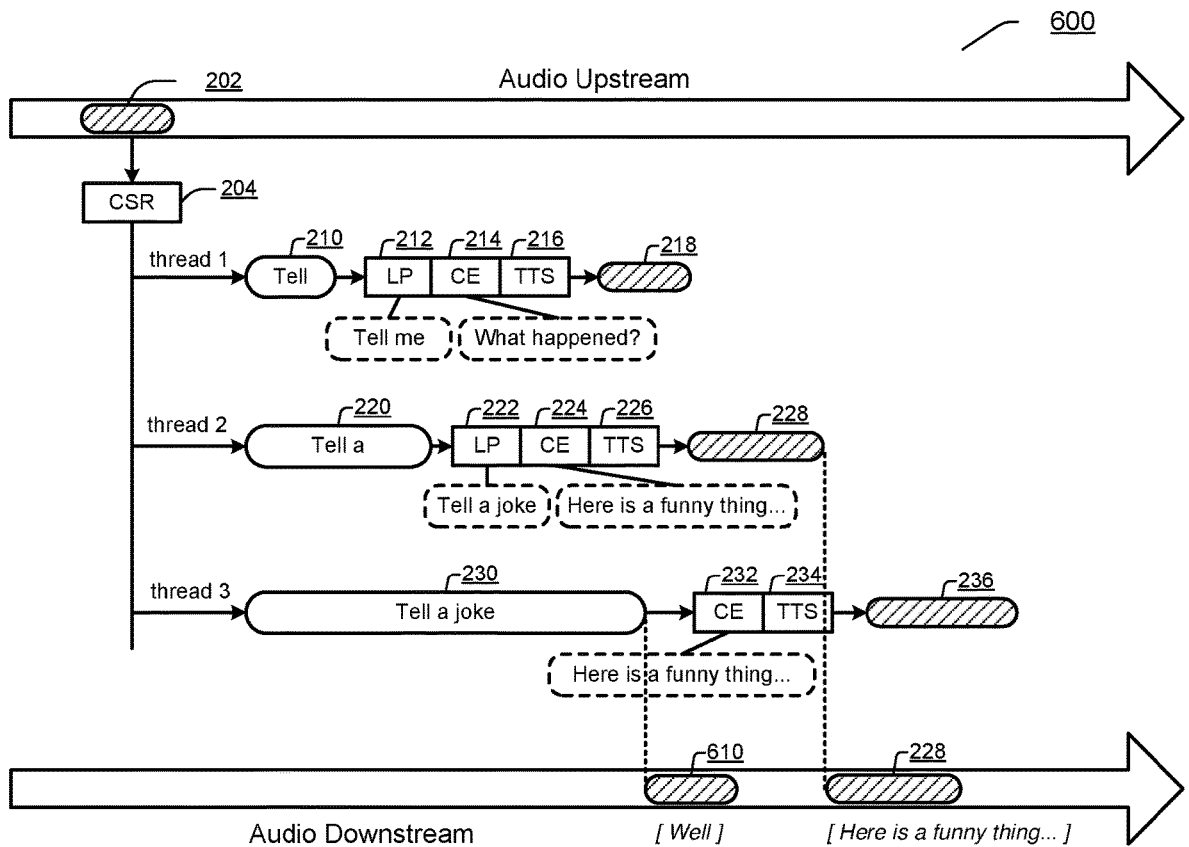
FIG. 6 illustrates an exemplary processing flow for responding in a voice conversation according to an embodiment.

FIG. 6 illustrates an exemplary processing flow 600 for responding in a voice conversation according to an embodiment. The processing flow 600 is based on the padding response mechanism, and may be deemed as an improvement of the processing flow 200 in FIG. 2.

The processing flow 600 is similar with the processing flow 200 in FIG. 2, except that a supplementary voice output 610 is provided to the user in the audio downstream before the primary voice output 228 is provided. Specifically, after obtaining the final SR result 230, the processing flow 600 may further determine, according to the method 500 in FIG. 5, whether criteria for providing a supplementary voice output which is based on a padding word, e.g., "Well", are met. Assuming that the criteria are met, the supplementary voice output 610 may be then generated and provided in the audio downstream accordingly.

In some cases, a voice conversation between a chatbot and a user may involve execution of a task. For example, in the voice conversation, the user may request the chatbot to execute a task. Herein, the task may refer to an operation or process that involves multiple-party interactions, complex procedures, etc., and takes longer time to execute as compared to making response in a pure chat scenario. For example, the task may be related to controlling a target smart device, e.g., opening a light, setting an alarm clock, adjusting a target temperature of an air conditioner, etc. For example, the task may be related to obtaining a certain service from a third-party service platform, e.g., calling a Taxi through a car-hailing app, booking a ticket on a ticket agency website, etc.

On one hand, since the execution of the task may take a rather long time, the chatbot may also need a long time to return a result of the execution of the task to the user in the voice conversation. For example, if the user requests to control a target device, the chatbot may need to transfer the request to a server or a cloud service node associated with the target device, the server or cloud service node needs to send a corresponding command to the target device, the target device adjusts its operation status according to the command and returns an execution result to the server or cloud service node, the server or cloud service node returns the execution result to the chatbot, and finally the chatbot may inform the user about the execution result by providing a voice output. The above procedure for controlling the target device is time consuming. Moreover, for example, if the user requests to obtain a certain service from a third-party service platform, since such a task involves interactions with the third-party service platform, it will also cause a rather long time to execute. In any cases, a long-time latency between receiving a request to execute a task from the user and providing an execution result to the user would bring higher risk that the user may get confused whether or not his task request has already been understood and is executed correctly.

On the other hand, it is required that the execution of the task shall be performed only once with respect to each task request. It would be unexpected if the user only request to execute the task once, but the chatbot causes the task to be executed more than one time.

The embodiments of the present disclosure propose an intent-execution response mechanism which may be applied in the application scenario in which a voice conversation between a chatbot and a user involves execution of a task as mentioned above. According to the intent-execution response mechanism, in response to a voice input from the user which requests to execute a task, the chatbot may firstly provide a supplementary voice output which is based on intent of the task to the user as an acknowledgement that the chatbot has understood the task, before providing a primary voice output to the user which indicates a result of executing the task. Moreover, the intent-execution response mechanism may ensure that the task is executed only once through triggering the execution of the task only by a final SR result of the voice input by the user.

Figure 7:
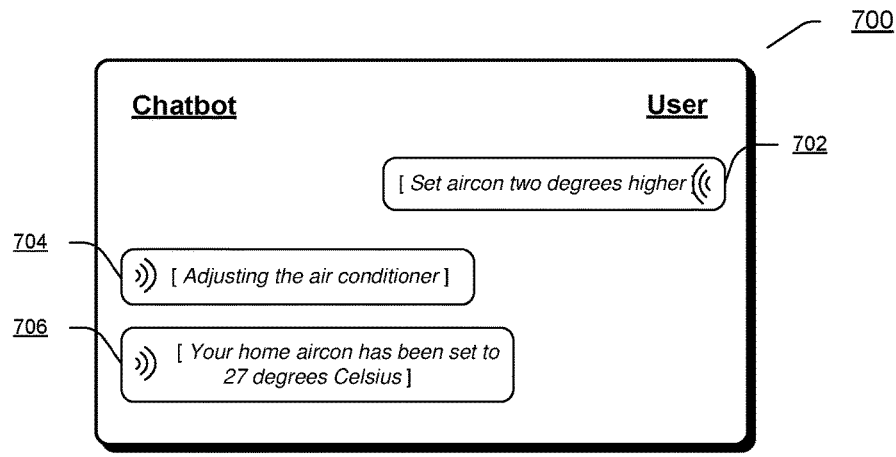
FIG. 7 illustrates an exemplary voice conversation according to an embodiment.

FIG. 7 illustrates an exemplary voice conversation 700 according to an embodiment. The voice conversation 700 may be based on, e.g., the intent-execution response mechanism. The voice conversation 700 is schematically shown in a chat window between a chatbot and a user.

The user may provide a voice input 702, e.g., "Set aircon two degrees higher", in an audio upstream. The voice input 702 may indicate that the user wants to request the chatbot to execute a task, e.g., increasing the temperature of the air conditioner by two degrees Celsius.

During receiving the voice input 702, the chatbot may identify, from predictions of the voice input 702, that intent of the task is to increase the temperature of the air conditioner by two degrees Celsius. Based on the intent of the task, the chatbot may generate and provide a supplementary voice output, e.g., "Adjusting the air conditioner".

After completing the receiving of the whole voice input 702, e.g., obtaining a final SR result of the whole voice input 702, the chatbot may identify the intent of the task based on the whole voice input 702. The chatbot may further execute the task based on the intent of the task, e.g., sending a command corresponding to the task to the air conditioner directly, or transferring the request by the user to a server of the air conditioner which is to control the air conditioner as requested, etc.

After the execution of the task is finished, the chatbot may receive a result of the execution of the task from the air conditioner, or the server, etc. The chatbot may further generate a primary voice output 706, e.g., "Your home aircon has been set to 27 degrees Celsius", based on the result of the execution of the task, and provide the primary voice output 702 in the audio downstream.

It should be appreciated that the chat window in FIG. 7 is exemplary, and depending on specific application requirements, the chat window may be changed in various manners in terms of layout, elements being incorporated, etc. Moreover, although the voice conversation 700 is presented in the visual chat window, the visual chat window may also be omitted in some cases that the chatbot is implemented in a smart device without or disabling display functions.

Figure 8:
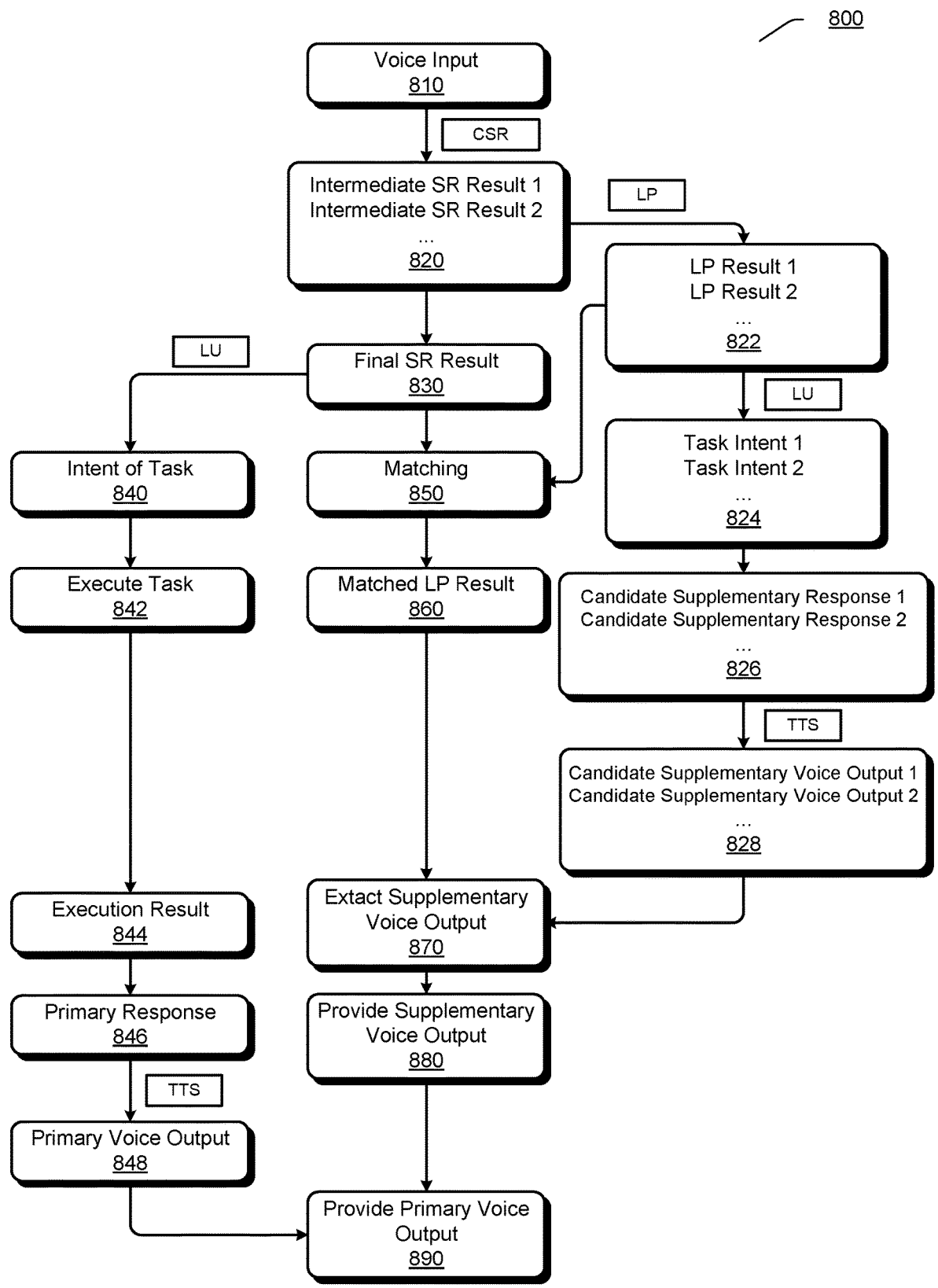
FIG. 8 illustrates an exemplary method for responding in a voice conversation according to an embodiment.

FIG. 8 illustrates an exemplary method 800 for responding in a voice conversation according to an embodiment. The method 800 may be an exemplary implementation of the intent-execution response mechanism.

A voice input 810 may be received by a chatbot from a user in an audio upstream in the voice conversation between the chatbot and the user. The voice input 810 may include a request for executing a task.

During receiving the voice input 810, the chatbot may perform continuous speech recognition (CSR) on the voice input 810. Through the CSR, at least one intermediate SR result 820 may be obtained, e.g., intermediate SR result 1, intermediate SR result 2, etc.

For each intermediate SR result, a thread may be established. In each thread, language prediction (LP) may be performed on the corresponding intermediate SR result so as to generate a LP result which may be deemed as a prediction of the voice input 810. Accordingly, at least one LP result 822 may be generated in the method 800, e.g., LP result 1, LP result 2, etc. Taking the intermediate SR result 1 as an example, a thread 1 may be established, in which the LP result 1 may be generated through performing the LP on the intermediate SR result 1.

In each thread, language understanding (LU) may be performed on the corresponding LP result so as to identify intent of the task. Accordingly, a set of task intents 824 may be identified in the method 800, e.g., task intent 1, task intent 2, etc. Taking the thread 1 as an example, the task intent 1 may be generated by the LU based on the LP result 1. The LU may adopt any existing natural language understanding techniques that direct to deriving a semantic representation from a text input, wherein in the method 800, the text input may be a LP result, and the semantic representation may be task intent. It should be appreciated that task intents may be predefined for an object on which tasks are to be executed. For example, assuming that the object is an air conditioner, a list of possible task intents may be predefined, e.g., "turn on air conditioner", "enter into the sleep mode", "increase the temperature by two degrees Celsius", etc. Thus, the purpose of the LU would be mapping a LP result into one of the predefined task intents.

In each thread, a candidate supplementary response may be generated based on the corresponding task intent. Accordingly, at least one candidate supplementary response 826 may be obtained in the method 800, e.g., candidate supplementary response 1, candidate supplementary response 2, etc. Taking the thread 1 as an example, the candidate supplementary response 1 may be generated based on the task intent 1. In an implementation, a candidate supplementary response may be formed by task intent directly. For example, if the identified task intent is "turn on air conditioner", then a candidate supplementary response "turn on air conditioner" may be formed from this identified task intent directly. In an implementation, a candidate supplementary response may be formed through generating a natural language expression relevant to the task intent. For example, if the identified task intent is "increase the temperature by two degrees Celsius", a candidate supplementary response may be generated as, e.g., "Adjusting the air conditioner", "The air conditioner is setting two degrees higher", etc. Various learning-based language models may be adopted here for generating a natural language expression relevant to task intent.

In each thread, text-to-speech (TTS) conversion may be performed on the corresponding candidate supplementary response so as to generate a candidate supplementary voice output. Accordingly, at least one candidate supplementary voice output 828 may be generated in the method 800, e.g., candidate supplementary voice output 1, candidate supplementary voice output 2, etc. Taking the thread 1 as an example, the candidate supplementary voice output 1 may be generated through performing the TTS conversion on the candidate supplementary response 1.

Through the CSR, a final SR result 830 may be obtained, which is a SR result of the whole voice input 810.

At 850, a matching may be performed between the final SR result 830 and the at least one LP result 822, so as to find out a matched LP result 860 and accordingly find out a matched thread. The matched LP result 860 may indicate a certain thread from which a supplementary voice output to be provided to the user shall be obtained. In other words, the matched LP result 860 may be used for extracting, at 870, a supplementary voice output from the at least one candidate supplementary voice output 828. Assuming that the LP result 2 in a thread 2 is determined as the matched LP result 860 and accordingly the thread 2 is a matched thread, then the candidate supplementary voice output 2 obtained through the thread 2 may be extracted as the final supplementary voice output to be provided to the user.

At 880, the extracted supplementary voice output may be provided to the user in an audio downstream.

According to the method 800, when the final SR result 830 is obtained, LU may be performed on the final SR result 830 so as to identify intent of the task 840. Then, at 842, the chatbot may trigger the execution of the task.

After the execution of the task is finished, a result 844 of the execution of the task may be obtained from, e.g., the object on which the task has been executed, a server or cloud service node for the object, etc. The execution result 844 may be predefined in various manners, e.g., only indicating whether the task has been executed successfully, describing the task together with whether the execution is successful or not, etc.

A primary response 846 may be generated based on the execution result 844. In an implementation, the primary response 846 may be formed by the execution result 844 directly. For example, if the execution result is "Successful", then a primary response "Successful" may be formed from this execution result directly, if the execution result is "The air conditioner is turned on successfully", then a primary response "The air conditioner is turned on successfully" may be formed from this execution result directly, etc. In an implementation, the primary response may be formed through generating a natural language expression relevant to the execution result. For example, if the execution result is "increase temperature by two degrees Celsius, successful", a primary response may be generated as, e.g., "The temperature has been adjusted successfully", "The air conditioner has been set two degrees higher", etc. Various learning-based language models may be adopted here for generating a natural language expression relevant to an execution result.

A primary voice output 848 may be generated based on the primary response 846 through TTS conversion, and provided to the user in the audio downstream at 890.

It should be appreciated that, since the process of generating and providing the supplementary voice output is usually faster than the process of executing the task and further generating and providing the primary voice output, the supplementary voice output may be provided in the audio downstream earlier than the primary voice output. However, during providing the supplementary voice output in the audio downstream, if the primary voice output gets ready to be provided, the providing of the supplementary voice output may be interrupted, and instead the providing of the primary voice output may be started in the audio downstream.

It should be appreciated that the method 800 is exemplary, and the present disclosure shall cover any additions, deletions, replacements and reordering applied to the steps in the method 800. In an implementation, although it is shown in FIG. 8 that the supplementary voice output is extracted at 870 from the at least one candidate supplementary voice output 828, it is not required that, when the extracting at 870 is performed, all the threads have already generated their respective candidate supplementary voice outputs or even have already generated their respective candidate supplementary responses or their respective task intents.

Figure 9:
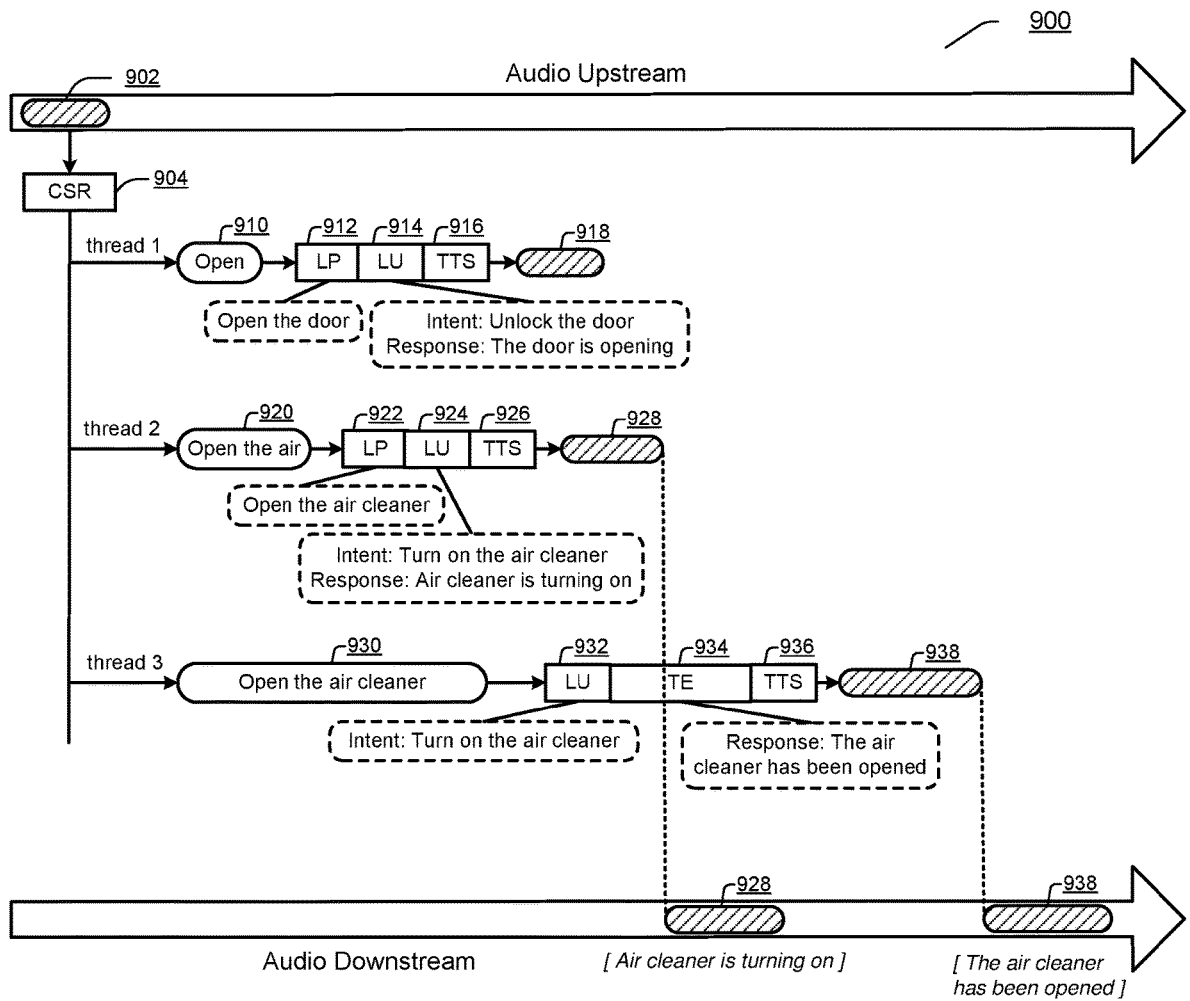
FIG. 9 illustrates an exemplary processing flow for responding in a voice conversation according to an embodiment.

FIG. 9 illustrates an exemplary processing flow 900 for responding in a voice conversation according to an embodiment. The processing flow 900 is based on the intent-execution response mechanism.

A voice input 902 from a user may be occurring in an audio upstream. It is assumed that the user intends to say a sentence "Open the air cleaner" in the voice input 902, so as to request to execute a task, e.g., turning on the air cleaner.

At 904, continuous speech recognition (CSR) is performed on the voice input 902 during receiving the voice input 902 in the audio upstream.

Assuming that an intermediate SR result 910, i.e., a word "Open", is firstly obtained by the CSR, then a thread 1 may be established for this intermediate SR result 910. In the thread 1, at 912, language prediction (LP) is made based on the intermediate SR result 910. For example, a LP result "Open the door" may be generated based on the intermediate SR result "Open". Then, at 914, a language understanding (LU) may be used for identifying task intent indicated in the LP result, e.g., "Unlock the door". Moreover, a candidate supplementary response, e.g., "The door is opening", may be generated based on the intent of the task "Unlock the door". At 916, a text-to-speech (TTS) conversion may be performed on the candidate supplementary response obtained at 914, so as to generate a candidate supplementary voice output 918 which is an audio clip corresponding to the candidate supplementary response "The door is opening".

Assuming that an intermediate SR result 920, i.e., a phrase "Open the air", is further obtained by the CSR, then a thread 2 may be established for this intermediate SR result 920. In the thread 2, at 922, a LP result "Open the air cleaner" may be generated based on the intermediate SR result 920. At 924, LU is performed on the LP result "Open the air cleaner" so as to identify task intent, e.g., "Turn on the air cleaner", and accordingly a candidate supplementary response "Air cleaner is turning on" may be generated. The candidate supplementary response "Air cleaner is turning on" is further used for generating a candidate supplementary voice output 928 through the TTS at 926.

Assuming that a final SR result 930, i.e., a sentence "Open the air cleaner", is further obtained by the CSR, then a thread 3 may be established for this final SR result 930. In the thread 3, LU is performed on the final SR result "Open the air cleaner" so as to identify task intent, e.g., "Turn on the air cleaner". Then, at 934, the chatbot may trigger a task execution (TE) process so as to turn on the air cleaner. Assuming that a result of executing the task indicates that the task has been executed successfully, a primary response "The air cleaner has been opened" may be generated accordingly. The primary response is further used for generating a primary voice output 938 through the TTS at 936. Then the primary voice output 938 may be provided to the user in an audio downstream.

The thread 1, thread 2 and thread 3 in FIG. 9 are established sequentially along with the user is speaking more words in the voice input 902. Accordingly, these threads may generate voice outputs in different time points. Especially, since the thread 1 and the thread 2 do not involve execution of the task, the candidate supplementary voice outputs 918 and 928 may be obtained much earlier than the primary voice output 938 in the thread 3.

In an implementation, after obtaining the final SR result 930, a matching between this final SR result 930 and those LP results in other threads may be performed so as to determine which thread is based on a correct prediction of the voice input 902. For example, in the example of FIG. 9, it may be determined that the LP result "Open the air conditioner" obtained at 922 in the thread 2 matches with the final SR result 930. Accordingly, the candidate supplementary voice output 928 by the thread 2 may be provided as a final supplementary voice output to the user in the audio downstream. As shown in FIG. 9, the candidate supplementary voice output 928 is provided earlier than the primary voice output 938 in the audio downstream. Through providing the supplementary voice output 928 in the audio downstream earlier than the primary voice output 938, it may be avoided that the user gets confused whether or not his task request has already been understood and is executed correctly.

It should be appreciated that although the example of FIG. 9 involves three exemplary threads established based on words recognized from the voice input 902, more or less threads may be established based on syllables, characters, phrases, etc. recognized from the voice input 902. Although it is shown in FIG. 9 that each of the threads established for an intermediate SR result obtains a candidate supplementary voice output, it is also possible that not each of these threads has obtained its candidate supplementary voice output when a matched LP result is identified from these threads or when a supplementary voice output corresponding to the matched LP result is provided in the audio downstream. In this case, those threads not finishing their processes may be stopped or removed immediately.

In some cases, during a voice conversation between a chatbot and a user, the user may speak less proactively. For example, after the chatbot provides a voice output to the user, the user may keep silent for a long time period. Under such circumstances, the chatbot may try to speak more so as to keep the conversation going smoothly.

The embodiments of the present disclosure propose a collective follow-up response mechanism which is configured for providing at least one supplementary voice output during a time period between a time point of completing the providing of a primary voice output and a time point of receiving a next voice input by the user. According to the collective follow-up response mechanism, in response to a voice input from the user, the chatbot may generate a primary response and a set of follow-up responses concurrently, wherein the set of follow-up responses are generated collectively at one time. After providing to the user a primary voice output which is based on the primary response, the chatbot may further provide at least one follow-up voice output, as supplementary voice output, which is based on the follow-up responses.

Figure 10:
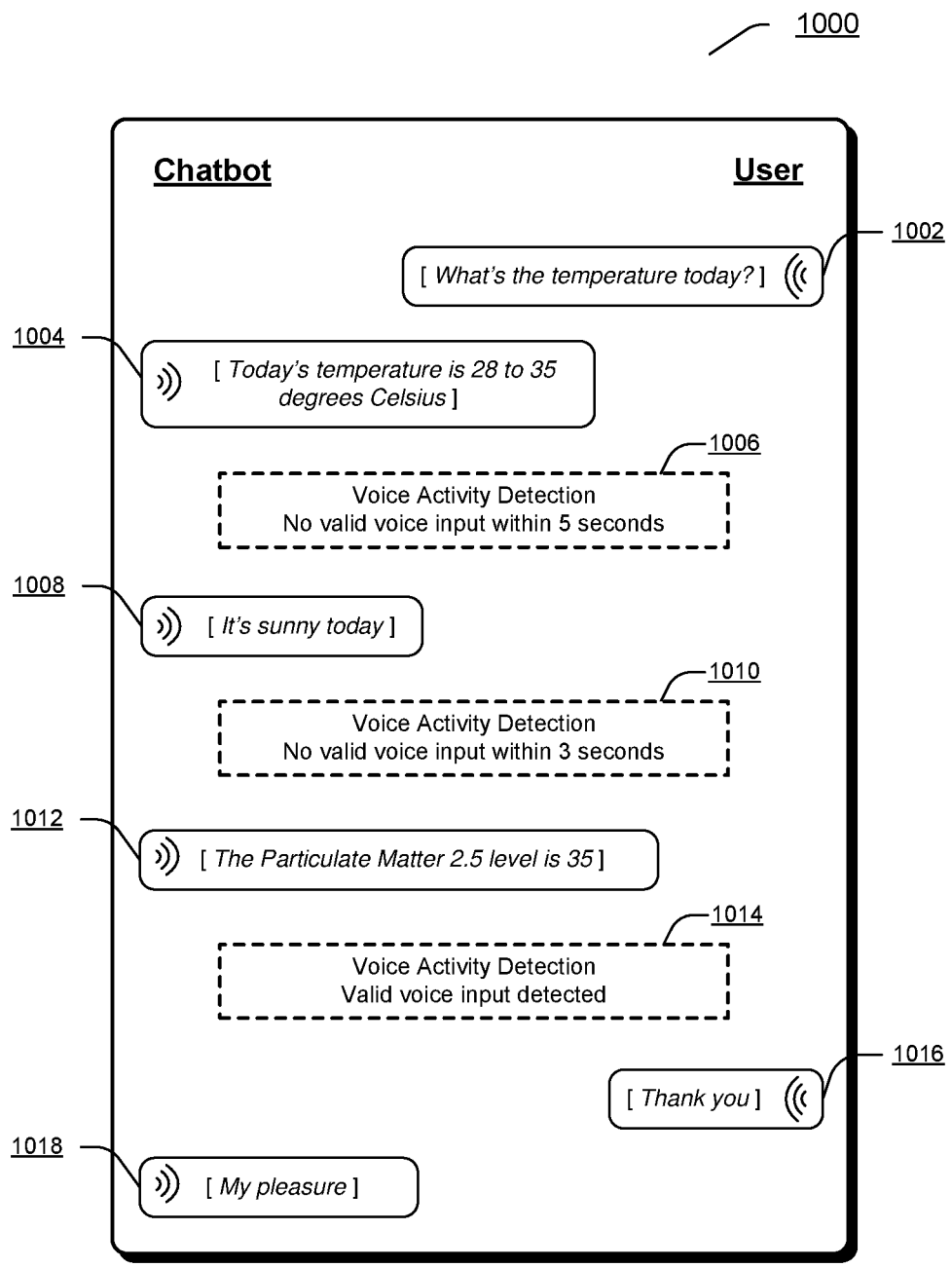
FIG. 10 illustrates an exemplary voice conversation according to an embodiment.

FIG. 10 illustrates an exemplary voice conversation 1000 according to an embodiment. The voice conversation 1000 may be based on, e.g., the collective follow-up response mechanism. The voice conversation 1000 is schematically shown in a chat window between a chatbot and a user.

The user may provide a voice input 1002, e.g., "What's the temperature today?", in an audio upstream.

In response to the voice input 1002, the chatbot may generate a primary response "Today's temperature is 28 to 35 degrees Celsius" and a set of follow-up responses concurrently. The set of follow-up responses may comprise, e.g., "It's sunny today", "The Particulate Matter 2.5 level is 35", "It will rain tomorrow", etc.

The chatbot may firstly provide a primary voice output 1004 which is generated based on the primary response to the user in an audio downstream. Then, at 1006, the chatbot may perform voice activity detection (VAD) to detect whether any further valid voice input occurs in the audio upstream.

If there is no valid voice input within a predetermined duration starting from the primary voice output, e.g., 5 seconds, the chatbot may extract a follow-up response, e.g., "It's sunny today", from the set of follow-up responses, and generate a follow-up voice output 1008 based on the extracted follow-up response. The chatbot may provide the follow-up voice output 1008 to the user as a supplementary voice output in the audio downstream. Then, at 1010, the chatbot may continue the voice activity detection to detect whether any further valid voice input occurs in the audio upstream.

If there is no valid voice input within a predetermined duration starting from the follow-up voice output 1008, e.g., 3 seconds, the chatbot may extract another follow-up response, e.g., "The Particulate Matter 2.5 level is 35", from the set of follow-up responses, and generate another follow-up voice output 1012 based on the extracted follow-up response. The chatbot may provide the follow-up voice output 1012 to the user as another supplementary voice output in the audio downstream. Then, at 1014, the chatbot may continue the voice activity detection to detect whether any further valid voice input occurs in the audio upstream.

Assuming that there is a valid voice input detected within a predetermined duration starting from the follow-up voice output 1012, for example, a further voice input 1016 of "Thank you" is received from the user, the chatbot may stop extracting further follow-up responses from the set of follow-up responses and accordingly stop generating further follow-up voice outputs based on the set of follow-up responses.

The chatbot may provide a voice output 1018 of "My pleasure" so as to respond to the voice input 1016.

It should be appreciated that the chat window in FIG. 10 is exemplary, and depending on specific application requirements, the chat window may be changed in various manners in terms of layout, elements being incorporated, etc. Moreover, although the voice conversation 1000 is presented in the visual chat window, the visual chat window may also be omitted in some cases that the chatbot is implemented in a smart device without or disabling display functions.

Figure 11:
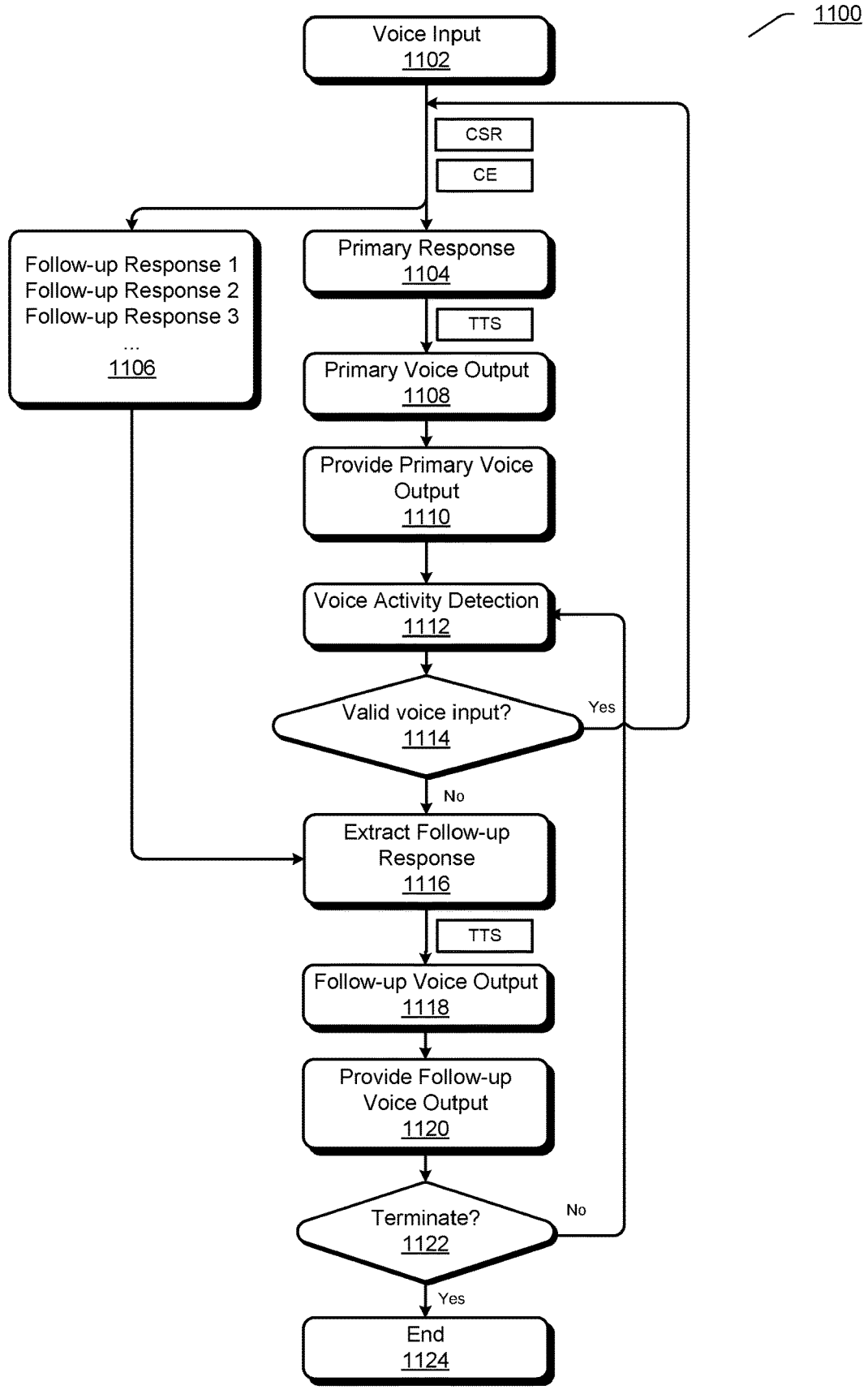
FIG. 11 illustrates an exemplary method for responding in a voice conversation according to an embodiment.

FIG. 11 illustrates an exemplary method 1100 for responding in a voice conversation according to an embodiment. The method 1100 may be an exemplary implementation of the collective follow-up response mechanism.

A voice input 1102 may be received by a chatbot from a user in an audio upstream in the voice conversation between the chatbot and the user. The voice input 1102 may include a request for executing a task.

During receiving the voice input 1102, the chatbot may perform continuous speech recognition (CSR) on the voice input 1102. The chatbot may use a conversation engine (CE) to process a correct prediction of the voice input 1102 which is based on an intermediate SR result or to process a final SR result of the voice input 1102. Through the CE, a primary response 1104 and a set of follow-up responses 1106 may be generated concurrently, wherein the set of follow-up responses 1106 may comprise, e.g., follow-up response 1, follow-up response 2, follow-up response 3, etc. The primary response 1104 may be an optimal direct reply to the voice input 1102, which is generated depending on specific implementations of the CE. In an implementation, each of the set of follow-up responses 1106 may also be a suitable response associated with the voice input 1102, but is used as a supplement to the primary response 1104. For example, assuming that the voice input 1102 is a query related to the weather, if the primary response 1104 involves information of temperature, then the set of follow-up responses 1106 may intend to provide weather information in other aspects, e.g., wind speed, cloud cover, air quality, etc. In an implementation, the set of follow-up responses 1106 may be formed from a relative verbose response determined by the CE. For example, assuming that besides generating the primary response 1104, the CE also generates a verbose response containing several sentences which is also suitable for responding to the voice input 1102, then the CE may split the verbose response into several parts, e.g., sentence by sentence, and each of the several parts may form a follow-up response in the set of follow-up responses 1106. In an implementation, instead of being as a response associated with the voice input 1102, the set of follow-up responses 1106 may also comprise responses not associated with the voice input 1102, e.g., new topics. In this case, those responses in the set of follow-up responses 1106 not associated with the voice input 1102 may also be generated by the CE according to specific implementations of the CE. This is an efficient way to keep the user engage to the conversation.

After generating the primary response 1104, the chatbot may perform text-to-speech (TTS) conversion on the primary response 1104 so as to generate a primary voice output 1108. Then, at 1110, the primary voice output 1108 may be provided to the user in an audio downstream.

After providing the primary voice output 1108, the chatbot may perform, at 1112, voice activity detection (VAD) in the audio upstream within a predetermined duration starting from the primary voice output. The predetermined duration may be defined manually according to various application requirements, e.g., 2 seconds, 3 seconds, etc. The predetermined duration may start from various time points, e.g., a time point of completing the providing of the primary voice output in the audio downstream, any time point during providing the primary voice output, etc. The VAD directs to detecting any apparent human speech activity in the audio upstream, e.g., valid voice input. Herein, a valid voice input refers to a voice input by the user which has enough volume to be recognized, enough length to comprise any meaningful sentences, phrases, or words, etc. For example, if a voice input detected by the VAD has a too low volume to be recognized, this voice input may be deemed as an invalid voice input. For example, if a voice input detected by the VAD has a too short length, which may be, e.g., coughing, exclamation, etc., this voice input may also be deemed as an invalid voice input.

At 1114, it may be determined whether the VAD has detected any valid voice input in the predetermined duration. If yes, i.e., the user provides a new voice input, the method 1100 may stop trying to provide any supplementary voice output based on the set of follow-up responses 1106, and return to the beginning so as to process this new voice input.

If it is determined at 1114 that the VAD does not detect any valid voice input during the predetermine duration, the method 1100 may extract a follow-up response from the set of follow-up responses 1106 at 1116. In an implementation, the set of follow-up responses 1106 may be ranked based on a predetermined rule, and thus a highest ranked follow-up response may be extracted at 1116. In an implementation, a follow-up response may be randomly extracted from the set of follow-up responses 1106. In any cases, after extracting a follow-up response at 1116, the set of follow-up responses 1106 may be updated by removing the extracted follow-up response so as to avoid the same follow-up response to be extracted again in the following process of the method 1100.

The chatbot may perform TTS conversion on the extracted follow-up response so as to generate a follow-up voice output 1118. Then, at 1120, the follow-up voice output 1118 may be provided to the user as a supplementary voice output in the audio downstream.

At 1122, the chatbot may decide whether the process of providing follow-up voice output shall be terminated. The decision at 1122 may be based on various termination criteria. In an implementation, the termination criteria at 1122 may be based on content of the voice input 1102. For example, if the user indicates in the voice input 1102 that he wants to listen three latest news, then it may be determined at 1122 that whether the number of news that have been provided to the user through the primary voice output and the possible previously-provided follow-up responses reaches the threshold number "three". In an implementation, the termination criteria at 1122 may be based on a context of the conversation between the chatbot and the user. For example, if the context implies that the user is very interested in sports, then when the user indicates in the voice input 1102 that he wants to listen to some sports news, a relative high threshold number, e.g., ten, may be set for the termination criteria at 1122. In an implementation, the termination criteria at 1122 may be based on the number of remaining follow-up responses in the set of follow-up responses 1106. For example, it may be determined at 1122 that whether the set of follow-up responses 1106 does not include any remaining follow-up response.

If it is decided at 1122 to terminate, the method 1100 will end at 1124. While if it is decided at 1122 not to terminate, the method 1100 will return to the VAD at 1112. Accordingly, the method 1100 will continue a process of providing a next follow-up voice output following the steps 1112 to 1124 in FIG. 11. For example, the chatbot may perform VAD in another predetermined duration starting from the previous voice output, e.g., the follow-up voice output provided previously. Said another predetermined duration may be the same as or different from the predetermined duration previously performing the VAD. Based on the detection result of the VAD, the chatbot may decide whether a next follow-up response shall be extracted and used for generating a next follow-up voice output to be provided to the user. In this way, the method 1100 will be performed iteratively, until a new valid voice input is detected or the termination criteria are met.

It should be appreciated that the method 1100 is exemplary, and the present disclosure shall cover any additions, deletions, replacements and reordering applied to the steps in the method 1100. For example, although it is shown in FIG. 11 that a follow-up response can be extracted only when no valid voice input is detected through VAD, it is possible that a follow-up response may be extracted when a certain type of valid voice input is detected through VAD. For example, if the detected valid voice output indicates that the user wants to hear more follow-up voice outputs, e.g., the user says "Continue", then the process of providing a next follow-up voice output may continue, instead of returning to the beginning of the method 1100.

Figure 12:
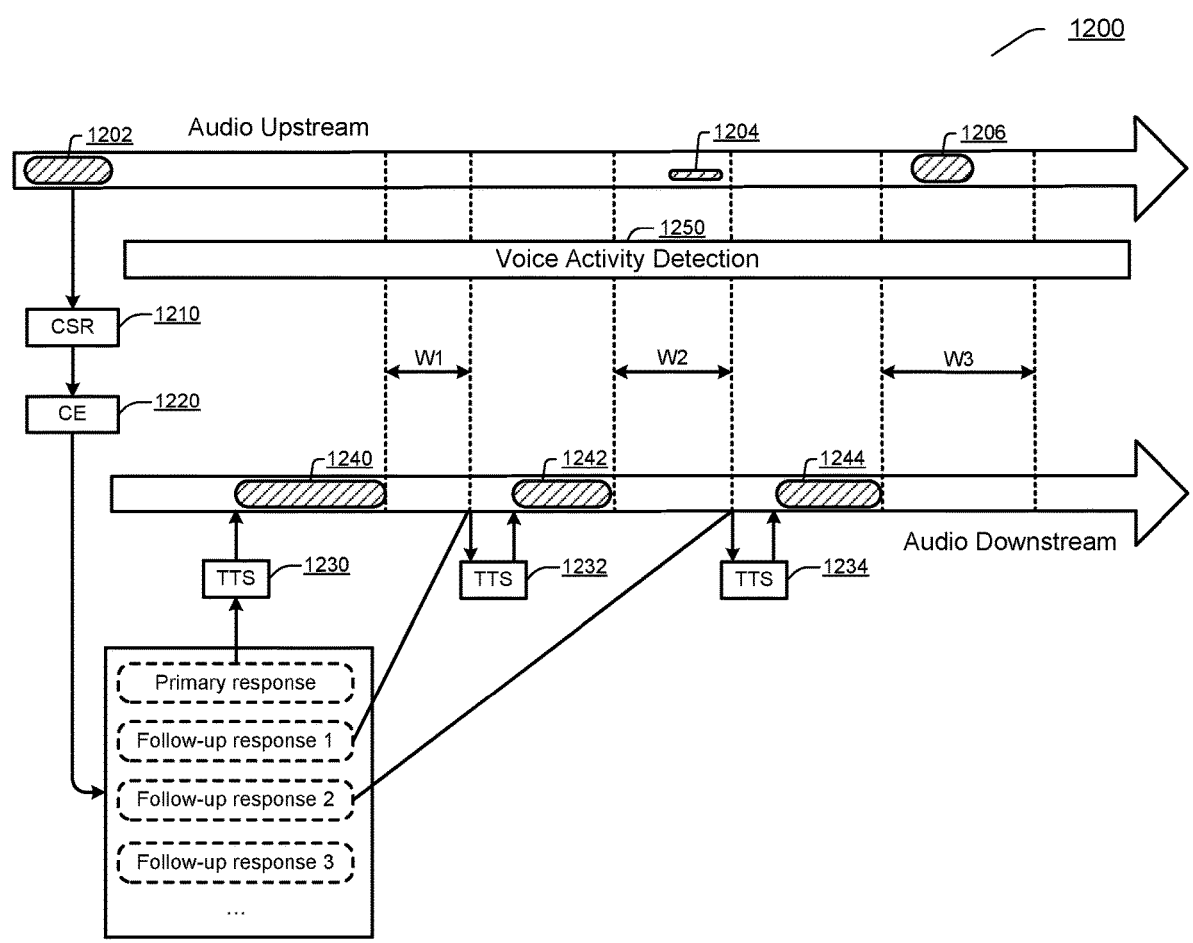
FIG. 12 illustrates an exemplary processing flow for responding in a voice conversation according to an embodiment.

FIG. 12 illustrates an exemplary processing flow 1200 for responding in a voice conversation according to an embodiment. The processing flow 1200 is based on the collective follow-up response mechanism.

A voice input 1202 from a user may be occurring in an audio upstream.

At 1210, continuous speech recognition (CSR) is performed on the voice input 1202 during receiving the voice input 1202 in the audio upstream.

At 1220, a conversation engine (CE) may be used for generating a primary response and a set of follow-up responses concurrently based on a correct prediction of the voice input 1202 which is based on an intermediate SR result, or based on a final SR result of the voice input 1202.

Upon the primary response is generated, text-to-speech (TTS) conversion may be performed on the primary response at 1230 so as to generate a primary voice output 1240. Then, the primary voice output 1240 may be provided to the user in an audio downstream.

In an implementation, voice activity detection (VAD) 1250 may be continuously performed throughout the processing flow 1200.

After providing the primary voice output 1240, it may be determined whether the VAD 1250 detects any valid voice input in the audio upstream within a predetermined duration, W1, starting from the previous voice output, e.g., the primary voice output. For example, the predetermined duration W1 may start from a time point of completing the providing of the primary voice output 1240 (as shown in FIG. 12). However, the predetermined duration W1 may also start from other time points, e.g., any time point during providing the primary voice output, etc.

According to the processing flow 1200, no valid voice input is detected within the predetermined duration W1. Then, a follow-up response 1 may be extracted from the set of follow-up responses, and generate a follow-up voice output 1242 through TTS at 1232. Upon the follow-up voice output 1242 is generated, it may be provided to the user as a supplementary voice output in the audio downstream.

After providing the follow-up voice output 1242, it may be determined whether the VAD 1250 detects any valid voice input in the audio upstream within a predetermined duration, W2, starting from the previous voice output, e.g., the follow-up voice output 1242. For example, the predetermined duration W2 may start from a time point of completing the providing of the follow-up voice output 1242 (as shown in FIG. 12) or any other time point during providing the follow-up voice output 1242, etc.

Assuming that the VAD detects a voice input 1204 in the audio upstream within the predetermined duration W2, but this voice input 1204 is further determined as an invalid voice input because of, e.g., low volume, etc. Thus, the processing flow 1200 may continue to extract a next follow-up response, e.g., follow-up response 2 from the set of follow-up responses, and generate a next follow-up voice output 1244 through TTS at 1234. Upon the follow-up voice output 1244 is generated, it may be provided to the user as a further supplementary voice output in the audio downstream.

After providing the follow-up voice output 1244, it may be determined whether the VAD 1250 detects any valid voice input in the audio upstream within a predetermined duration, W3, starting from the previous voice output, e.g., the follow-up voice output 1244. For example, the predetermined duration W3 may start from a time point of completing the providing of the follow-up voice output 1244 (as shown in FIG. 12) or any other time point during providing the follow-up voice output 1244, etc.

Assuming that the VAD 1250 detects a valid voice input 1206 in the audio upstream within the predetermined duration W3, the processing flow 1200 may stop generating further follow-up voice outputs based on the set of follow-up responses. For example, follow-up response 3 and any subsequent follow-up responses in the set of follow-up responses would not be used for generating follow-up voice outputs and being provided to the user.

The embodiments of the present disclosure further propose a recursive follow-up response mechanism, which is also configured for providing at least one supplementary voice output during a time period between a time point of completing the providing of a primary voice output and a time point of receiving a next voice input by the user. However, as compared to the collective follow-up response mechanism, the recursive follow-up response mechanism would generate a set of follow-up responses recursively through a plurality of iterations after generating a primary response, instead of generating the set of follow-up responses at one time. For example, the recursive follow-up response mechanism may generate the set of follow-up responses one-by one, and a next follow-up response would be generated only when a certain condition is met.

When processing costs and/or latencies of generating follow-up responses are high, the collective follow-up response mechanism which generates all the follow-up responses within one call to CE would be inefficient. For example, if a user speaks a new voice input before all the generated follow-up responses are processed for providing corresponding follow-up voice outputs, those remaining follow-up responses not having been processed shall be discarded. Thus, the high costs of generating these follow-up responses are wasted. In contrast, the recursive follow-up response mechanism generates one follow-up response at one time calling to CE, and only when a certain condition is met after a follow-up voice output has been provided, a next call to CE would be performed so as to generate a next follow-up response. Thus, even if the process of providing follow-up voice outputs is interrupted in the middle by a new voice input, no wasted calls to CE would occur, and accordingly processing resources would be saved.

Moreover, according to the collective follow-up response mechanism, since contents included in follow-up responses are static after these follow-up responses have been generated through one single call to CE, it would be impossible to support dynamic changes of the contents in the generated follow-up responses, e.g., inserting breaking news just happened during the process of providing follow-up voice outputs. On the contrary, since the recursive follow-up response mechanism generates a follow-up response just before providing a corresponding follow-up voice output, there is flexibility to dynamically adjust content included in a next follow-up response to be generated.

Furthermore, it is possible for the recursive follow-up response mechanism to implement more flexible and complex policies on whether or not to go on providing follow-up voice outputs. For example, for each time calling the CE, the chatbot may dynamically re-evaluate whether to continue the process based on voice activity detection (VAD), context of conversation, latest voice input, etc. In some scenarios, the recursive follow-up response mechanism may also support infinite providing of follow-up voice outputs, as long as the re-evaluating is keeping positive.

Figure 13:
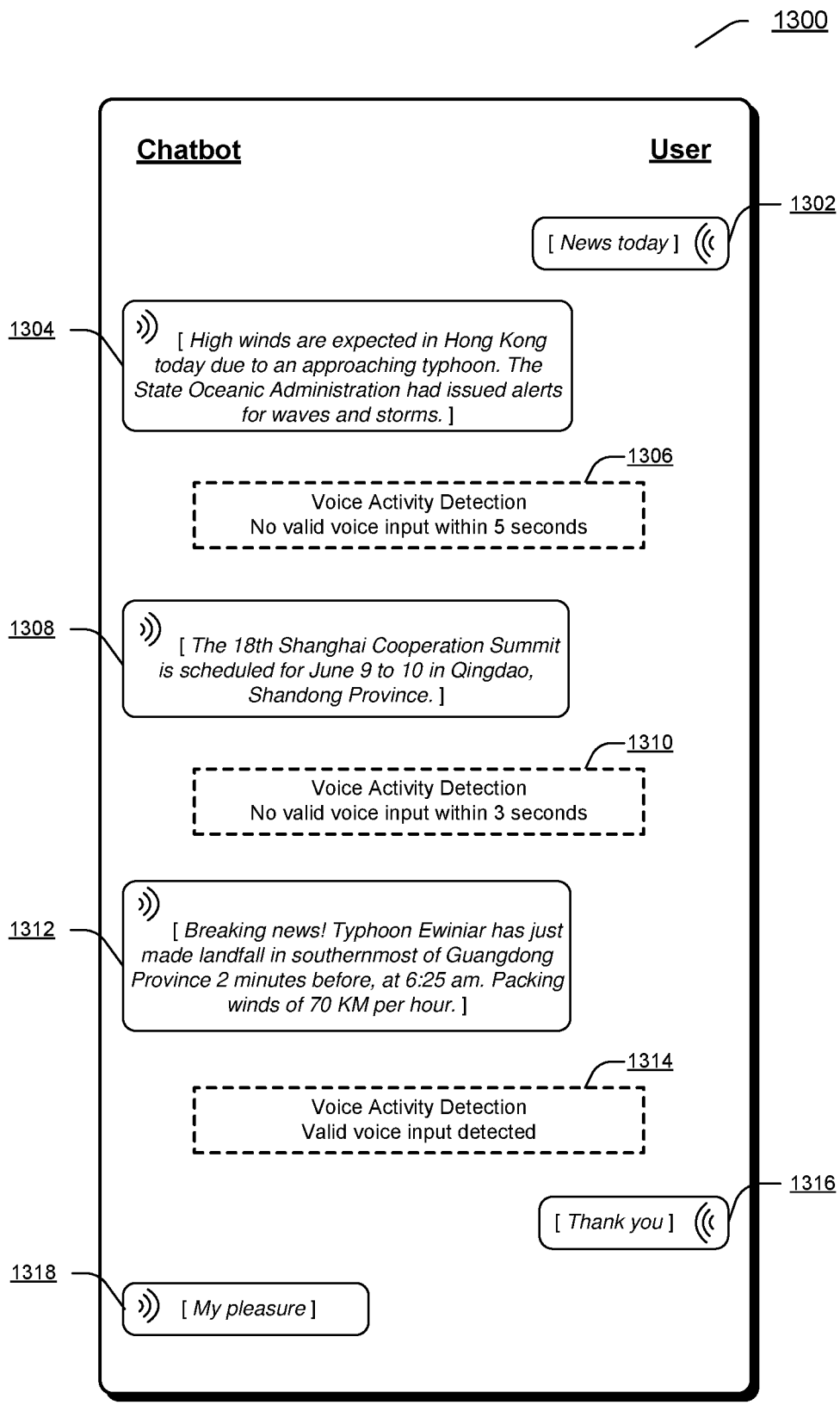
FIG. 13 illustrates an exemplary voice conversation according to an embodiment.

FIG. 13 illustrates an exemplary voice conversation 1300 according to an embodiment. The voice conversation 1300 may be based on, e.g., the recursive follow-up response mechanism. The voice conversation 1300 is schematically shown in a chat window between a chatbot and a user.

The user may provide a voice input 1302, e.g., "News today", in an audio upstream.

In response to the voice input 1302, the chatbot may generate a primary response which includes a piece of news, e.g., "High winds are expected in Hong Kong today due to an approaching typhoon. The State Oceanic Administration had issued alerts for waves and storms", and provide a primary voice input 1304, which is generated based on the primary response, to the user in an audio downstream.

Then, at 1306, the chatbot may perform voice activity detection to detect whether any further valid voice input occurs in the audio upstream.

Assuming that no valid voice input is detected within a predetermined duration starting from the primary voice output, e.g., 5 seconds, the chatbot may further generate a follow-up response which includes another piece of news, e.g., "The 18th Shanghai Cooperation Summit is scheduled for June 9 to 10 in Qingdao, Shandong Province". The chatbot may generate a follow-up voice output 1308 based on the follow-up response, and provide the follow-up voice output 1308 to the user as a supplementary voice output in the audio downstream. Then, at 1310, the chatbot may continue the voice activity detection to detect whether any further valid voice input occurs in the audio upstream.

If no valid voice input is detected within a predetermined duration starting from the follow-up voice output 1308, e.g., 3 seconds, the chatbot may further generate a second follow-up response which includes another piece of news, e.g., "Breaking news! Typhoon Ewiniar has just made landfall in southernmost of Guangdong Province 2 minutes before, at 6:25 am. Packing winds of 70 KM per hour". For example, the news included in the second follow-up response may be just obtained by the chatbot during preparing and providing the primary voice output 1304 or the follow-up voice output 1308. The chatbot may generate a follow-up voice output 1312 based on the second follow-up response, and provide the follow-up voice output 1312 to the user as a second supplementary voice output in the audio downstream. Then, at 1314, the chatbot may continue the voice activity detection to detect whether any further valid voice input occurs in the audio upstream.

Assuming that there is a valid voice input detected within a predetermined duration starting from the follow-up voice output 1312, for example, a further voice input 1316 of "Thank you" is received from the user, the chatbot may stop generating further follow-up responses and accordingly stop generating and providing further follow-up voice outputs.

The chatbot may provide a voice output 1318 of "My pleasure" so as to respond to the voice input 1316.

It should be appreciated that the chat window in FIG. 13 is exemplary, and depending on specific application requirements, the chat window may be changed in various manners in terms of layout, elements being incorporated, etc. Moreover, although the voice conversation 1300 is presented in the visual chat window, the visual chat window may also be omitted in some cases that the chatbot is implemented in a smart device without or disabling display functions.

Figure 14:
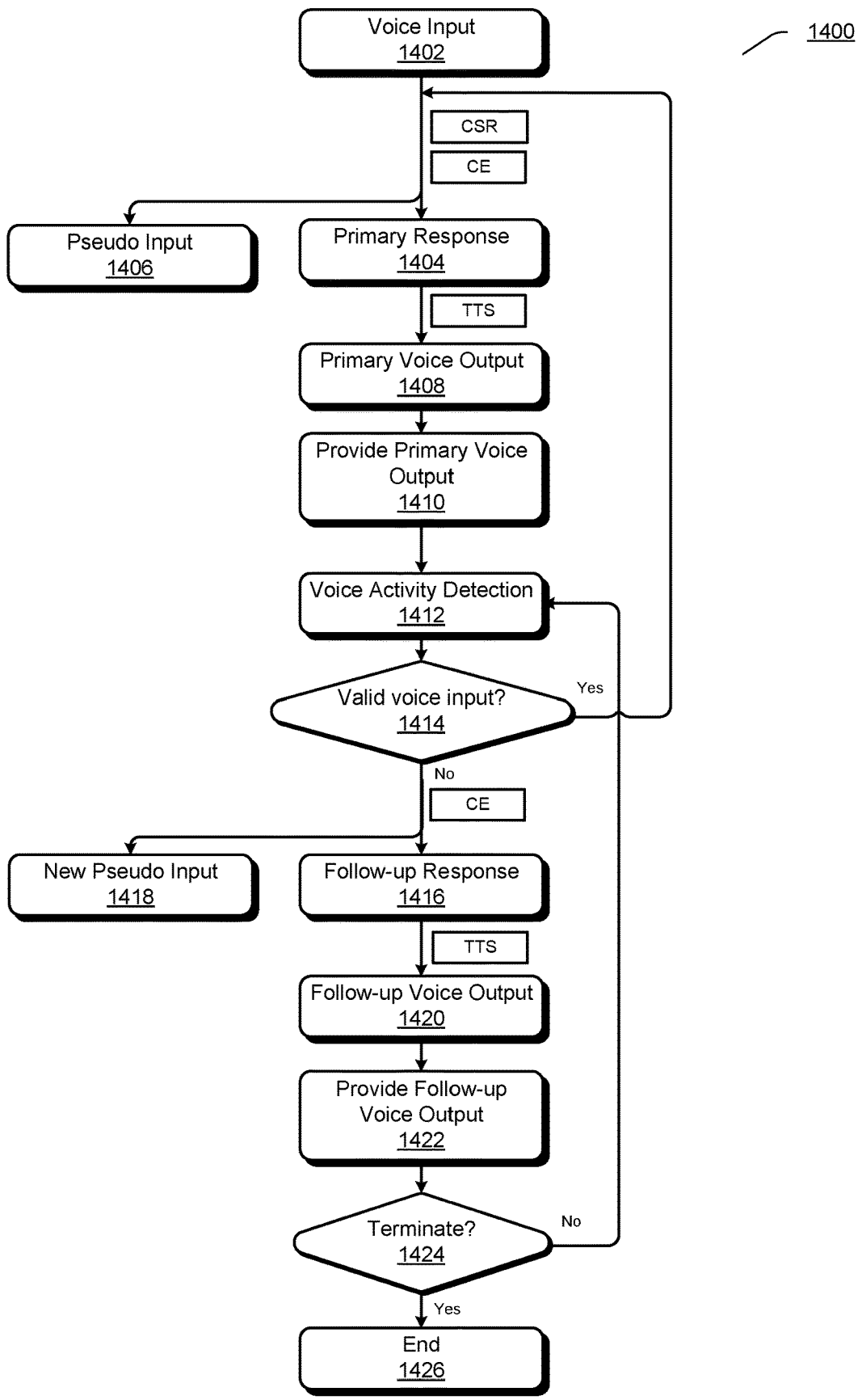
FIG. 14 illustrates an exemplary method for responding in a voice conversation according to an embodiment.

FIG. 14 illustrates an exemplary method 1400 for responding in a voice conversation according to an embodiment. The method 1400 may be an exemplary implementation of the recursive follow-up response mechanism.

A voice input 1402 may be received by a chatbot from a user in an audio upstream in the voice conversation between the chatbot and the user.

During receiving the voice input 1402, the chatbot may perform continuous speech recognition (CSR) on the voice input 1402. The chatbot may use a conversation engine (CE) to process a correct prediction of the voice input 1402 which is based on an intermediate SR result or to process a final SR result of the voice input 1402. Through the CE, a primary response 1404 may be generated, which is an optimal reply to the voice input 1402 generated depending on specific implementations of the CE.

Along with the primary response 1404, the CE may also generate a pseudo input 1406 based at least on the voice input 1402. The pseudo input 1406 directs to expressing intent of the user reflected in the voice input 1402, and may be the same as content of the voice input 1402, or semantically relevant to the content of the voice input 1402. For example, if the voice input 1402 is "Give some news", the pseudo input 1406 may be generated as, e.g., "Give some news", "news today", etc. The pseudo input 1406 may be later used for generating a follow-up response in the subsequent process of the method 1400.

After generating the primary response 1404, the chatbot may perform text-to-speech (TTS) conversion on the primary response 1404 so as to generate a primary voice output 1408. Then, at 1410, the primary voice output 1408 may be provided to the user in an audio downstream.

According to the method 1400, after providing the primary voice output 1408, the chatbot may try to recursively generate one or more follow-up responses and provide corresponding follow-up voice outputs through a plurality of iterations. For a single iteration, the chatbot will generate only one follow-up response and provide one corresponding follow-up voice output.

After providing the primary voice output 1408, the chatbot may perform, at 1412, voice activity detection (VAD) in the audio upstream within a predetermined duration starting from the previous voice output, e.g., the primary voice output 1408. The predetermined duration may start from various time points, e.g., a time point of completing the providing of the primary voice output in the audio downstream, any time point during providing the primary voice output, etc.

At 1414, it may be determined whether the VAD has detected any valid voice input in the predetermined duration. If yes, i.e., the user provides a new valid voice input, the method 1400 may stop trying to provide any supplementary voice output, and return to the beginning so as to process this new voice input.

If it is determined at 1414 that the VAD does not detect any valid voice input during the predetermined duration, the chatbot may use the CE to generate a follow-up response 1416 based at least on a pseudo input which is generated along with the previously-generated response, i.e., the pseudo input 1406 generated along with the primary response 1404. In an implementation, the generation of the follow-up response 1416 may be further based on a context of the conversation. The follow-up response 1416 is also a suitable response associated with the voice input 1402, but is used as a supplement to the primary response 1404. For example, assuming that the voice input 1402 is a query related to the weather, if the primary response 1404 involves information of temperature, then the follow-up response 1416 may further provide weather information about, e.g., wind speed, etc.

Along with the follow-up response 1416, the CE may also generate a new pseudo input 1418 based at least on the voice input 1402. Similar with the pseudo input 1406, the new pseudo input 1418 may also direct to expressing intent of the user reflected in the voice input 1402, and may be the same as the content of the voice input 1402, or semantically relevant to the content of the voice input 1402. The pseudo input 1418 may be later used for generating a next follow-up response in the subsequent iteration of the method 1400.

The chatbot may perform TTS conversion on the follow-up response 1416 so as to generate a follow-up voice output 1420. Then, at 1422, the follow-up voice output 1420 may be provided to the user as a supplementary voice output in the audio downstream.

At 1424, the chatbot may decide whether the process of providing follow-up voice outputs shall be terminated. The decision at 1424 may be based on various termination criteria. In an implementation, the termination criteria at 1424 may be based on the content of the voice input 1402. For example, if the user indicates in the voice input 1402 that he wants to listen three latest news, then it may be determined at 1424 that whether the number of news that have been provided to the user through the primary voice output and the possible previously-provided follow-up responses reaches the threshold number "three". In an implementation, the termination criteria at 1424 may be based on a context of the conversation. For example, if the context implies that the user is very interested in sports, then when the user indicates in the voice input 1402 that he wants to listen some sports news, a relative high threshold number, e.g., ten, may be set for the termination criteria at 1424.

If it is decided at 1424 to terminate, the method 1400 will end at 1426. While if it is decided at 1424 not to terminate, the method 1400 will return to the VAD at 1414. Accordingly, the method 1400 will continue to perform a next iteration for providing a next follow-up voice output following the steps 1412 to 1126 in FIG. 14. For example, in the next iteration, the chatbot may perform VAD in another predetermined duration starting from the previous voice output, e.g., the follow-up voice output provided previously. Said another predetermined duration may be the same as or different from the predetermined duration previously performing the VAD. Based on the detection result of the VAD, the chatbot may decide whether a next follow-up response shall be generated based at least on a pseudo input, e.g., the pseudo input 1418 generated along with the previous follow-up response. If the next follow-up response is generated, it is further used for generating a next follow-up voice output to be provided to the user. Moreover, a new pseudo input may be generated along with said next follow-up response. In this way, the method 1400 will be performed iteratively, until a new valid voice input is detected or the termination criteria are met.

It should be appreciated that the method 1400 is exemplary, and the present disclosure shall cover any additions, deletions, replacements and reordering applied to the steps in the method 1400. For example, although it is shown in FIG. 14 that a follow-up response can be generated only when no valid voice input is detected through VAD, it is possible that a follow-up response may be generated when a certain type of valid voice input is detected through VAD. For example, if the detected valid voice output indicates that the user wants to hear more follow-up voice outputs, then the process of providing a next follow-up voice output may continue, instead of returning to the beginning of the method 1400.

Figure 15:
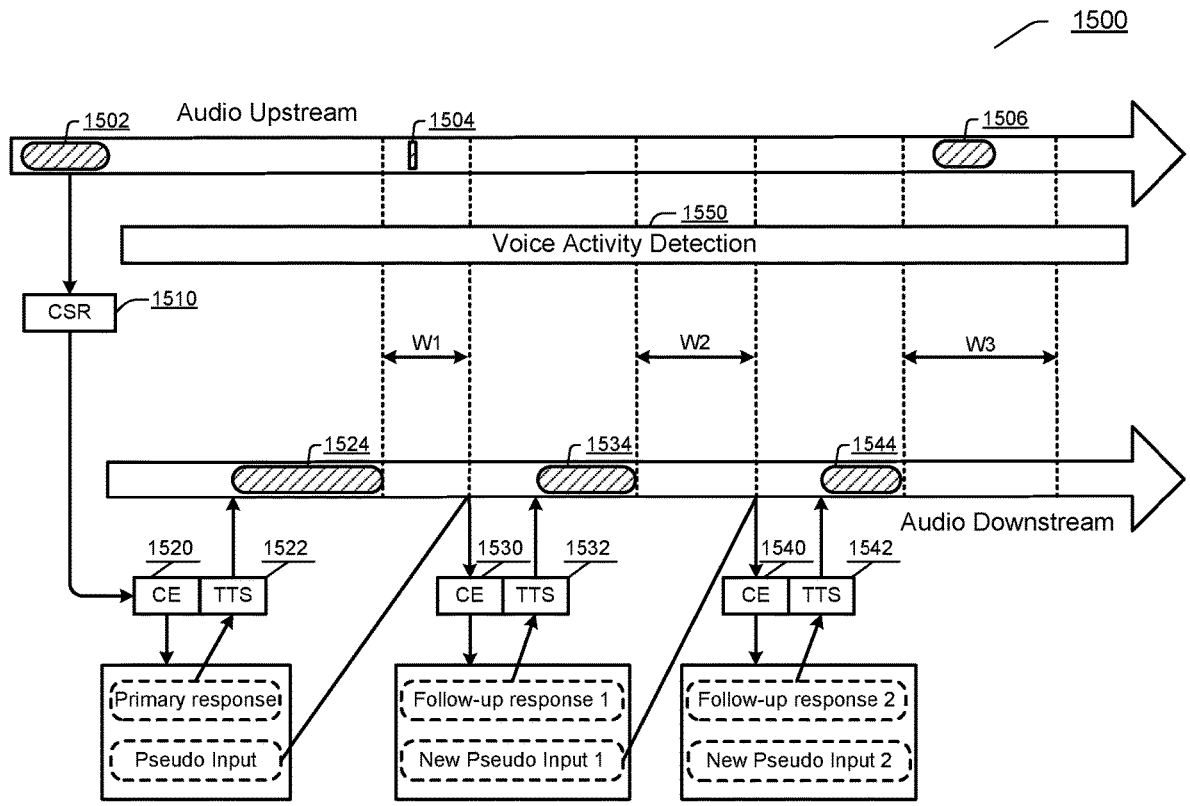
FIG. 15 illustrates an exemplary processing flow for responding in a voice conversation according to an embodiment.

FIG. 15 illustrates an exemplary processing flow 1500 for responding in a voice conversation according to an embodiment. The processing flow 1500 is based on the recursive follow-up response mechanism.

A voice input 1502 from a user may be occurring in an audio upstream.

At 1510, continuous speech recognition (CSR) is performed on the voice input 1502 during receiving the voice input 1502 in the audio upstream.

At 1520, a conversation engine (CE) may be used for generating a primary response and a pseudo input based on a correct prediction of the voice input 1502 which is based on an intermediate SR result, or based on a final SR result of the voice input 1502.

Upon the primary response is generated, text-to-speech (TTS) conversion may be performed on the primary response at 1522 so as to generate a primary voice output 1524. Then, the primary voice output 1524 may be provided to the user in an audio downstream.

In an implementation, voice activity detection (VAD) 1550 may be continuously performed throughout the processing flow 1500.

After providing the primary voice output 1524, it may be determined whether the VAD 1550 detects any valid voice input in the audio upstream within a predetermined duration, W1, starting from the previous voice output, e.g., the primary voice output. For example, the predetermined duration W1 may start from a time point of completing the providing of the primary voice output 1524 (as shown in FIG. 15), or start from other time points, e.g., any time point during providing the primary voice output 1524, etc.

Assuming that the VAD detects a voice input 1504 in the audio upstream within the predetermined duration W1, but this voice input 1504 is further determined as an invalid voice input because of, e.g., too short length, etc. Thus, the processing flow 1500 may continue to perform an iteration for generating and providing a follow-up voice output. For example, at 1530, the CE may be used for generating a follow-up response 1 based at least on a pseudo input generated along with the previous response, e.g., the pseudo input generated along with the primary response. Meanwhile, the CE may also generate a new pseudo input 1. Upon the follow-up response 1 is generated, TTS conversion may be performed on the follow-up response 1 at 1532 so as to generate a follow-up voice output 1534. Then, the follow-up voice output 1534 may be provided to the user as a supplementary voice output in the audio downstream.

After providing the follow-up voice output 1534, it may be determined whether the VAD 1550 detects any valid voice input in the audio upstream within a predetermined duration, W2, starting from the previous voice output, e.g., the follow-up voice output 1534. For example, the predetermined duration W2 may start from a time point of completing the providing of the follow-up voice output 1534 (as shown in FIG. 15) or any other time point during providing the follow-up voice output 1534, etc.

Assuming that the VAD does not detect any valid voice input in the audio upstream within the predetermined duration W2, the processing flow 1500 may continue to perform a next iteration for generating and providing a further follow-up voice output. For example, at 1540, the CE may be used for generating a follow-up response 2 based at least on a pseudo input generated along with the previous response, e.g., the new pseudo input 1 generated along with the follow-up response 1. Meanwhile, the CE may also generate a new pseudo input 2. Upon the follow-up response 2 is generated, TTS conversion may be performed on the follow-up response 2 at 1542 so as to generate a follow-up voice output 1544. Then, the follow-up voice output 1544 may be provided to the user as a further supplementary voice output in the audio downstream.

After providing the follow-up voice output 1544, it may be determined whether the VAD 1550 detects any valid voice input in the audio upstream within a predetermined duration, W3, starting from the previous voice output, e.g., the follow-up voice output 1544. For example, the predetermined duration W3 may start from a time point of completing the providing of the follow-up voice output 1544 (as shown in FIG. 15) or any other time point during providing the follow-up voice output 1544, etc.

Assuming that the VAD 1550 detects a valid voice input 1506 in the audio upstream within the predetermined duration W3, the processing flow 1500 may stop performing any further iteration for trying to provide further follow-up voice outputs.

It should be appreciated that although a plurality of exemplary multi-phrase response mechanisms have been discussed above separately, any of these mechanisms may be combined together according to specific application designs and requirements. For example, when combining the intent-execution response mechanism with the padding response mechanism, taking the conversation 700 in FIG. 7 as an example, instead of the supplementary voice output 704 of "Adjusting the air conditioner", the chatbot may provide a supplementary voice output "Okay. Adjusting the air conditioner" wherein the padding word "Okay" is obtained through the padding response mechanism and the sentence "Adjusting the air conditioner" is obtained through the intent-execution response mechanism. For example, when combining the collective follow-up response mechanism with the padding response mechanism, taking the conversation 1000 in FIG. 10 as an example, instead of the primary voice output 1004 of "Today's temperature is 28 to 35 degrees Celsius", the chatbot may provide a voice output "Hmm, today's temperature is 28 to 35 degrees Celsius" wherein the padding word "Hmm" is obtained through the padding response mechanism and the sentence "today's temperature is 28 to 35 degrees Celsius" is obtained through the collective follow-up response mechanism. Similarly, any other combinations of the multi-phrase response mechanisms would be obvious for those skilled in the art.

When implementing anyone or a combination of the exemplary multi-phrase response mechanisms discussed above in a chatbot, the chatbot may dynamically determine whether to apply a certain multi-phrase response mechanism among the multi-phrase response mechanisms during a voice conversation. For example, the chatbot may keep detecting whether there is a voice input occurred in an audio upstream. When a voice input is detected as occurring in the audio upstream, the chatbot may first provide a supplementary voice output in an audio downstream through the padding response mechanism, and then provide a primary voice output in the audio downstream. Meanwhile, if the voice input is detected to be related to a task, the chatbot may additionally provide a second supplementary voice output through the intent-execution response mechanism after providing the supplementary voice output generated by the padding response mechanism, or provide the second supplementary voice output generated by the intent-execution response mechanism instead of the supplementary voice output generated by the padding response mechanism, and then the chatbot may provide a primary voice output through the intent-execution response mechanism. In any cases, after the primary voice output is provided, the chatbot may keep detecting whether there is a further valid voice input occurred in the audio upstream. If no further valid voice input is detected in the audio upstream within a predetermined time period, the chatbot may further provide a follow-up voice output in the audio downstream through either of the collective follow-up response mechanism or the recursive follow-up response mechanism. Then, the chatbot may continue to detect valid voice input in a second predetermined time period, and determine whether to provide a second follow-up voice output in the audio downstream through either of the collective follow-up response mechanism or the recursive follow-up response mechanism, and so on.

Figure 16:
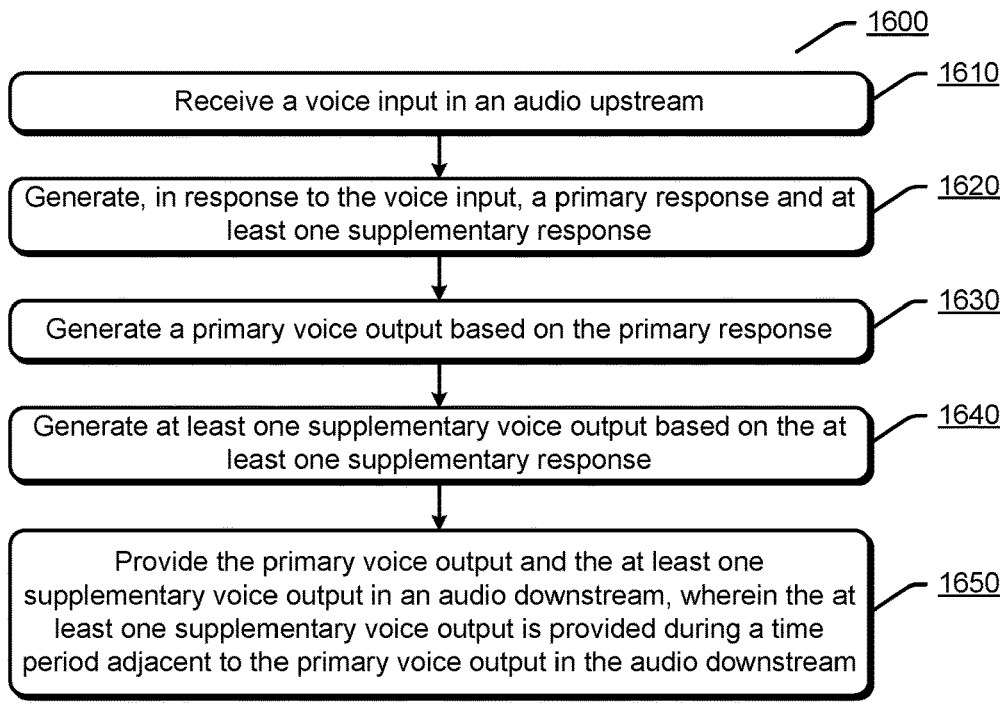
FIG. 16 illustrates a flowchart of an exemplary method for responding in a voice conversation by an electronic conversational agent according to an embodiment.

FIG. 16 illustrates a flowchart of an exemplary method 1600 for responding in a voice conversation by an electronic conversational agent according to an embodiment.

At 1610, a voice input may be received in an audio upstream.

At 1620, in response to the voice input, a primary response and at least one supplementary response may be generated.

At 1630, a primary voice output may be generated based on the primary response.

At 1640, at least one supplementary voice output may be generated based on the at least one supplementary response.

At 1650, the primary voice output and the at least one supplementary voice output may be provided in an audio downstream, wherein the at least one supplementary voice output is provided during a time period adjacent to the primary voice output in the audio downstream.

In an implementation, no valid voice input is received during the time period.

In an implementation, the time period is between a time point of completing the receiving of the voice input and a time point of providing the primary voice output.

According to the above implementation, the generating the at least one supplementary response may comprise: generating the at least one supplementary response based on at least one padding word, wherein duration of output of the at least one padding word is within duration of the time period with a predetermined probability. The generating the primary response may comprise: generating a prediction of the voice input during receiving the voice input; and generating the primary response based on the prediction.

According to the above implementation, the voice input is associated with a task, and the generating the at least one supplementary response may comprise: generating a prediction of the voice input during receiving the voice input; identifying intent of the task based on the prediction; and generating the at least one supplementary response based on the intent of the task. The generating the primary response may comprise: identifying the intent of the task based on the voice input after completing the receiving of the voice input; executing the task based on the intent of the task; and generating the primary response based on a result of executing the task.

In an implementation, the time period is between a time point of completing the providing of the primary voice output and a time point of receiving a next voice input.

According to the above implementation, the generating the at least one supplementary response may comprise: generating a set of follow-up responses concurrently with the generating of the primary response. The generating the at least one supplementary voice output may comprise, for each follow-up response in the set of follow-up responses: performing voice activity detection in the audio upstream within a predetermined duration starting from a previous voice output; and if no valid voice input is detected through the voice activity detection, generating a follow-up voice output based on the follow-up response. While if a valid voice input is detected through the voice activity detection, the method may stop generating follow-up voice outputs based on the set of follow-up responses.

According to the above implementation, the generating the at least one supplementary response may comprise: generating a set of follow-up responses recursively through a plurality of iterations after the generating of the primary response. The generating the at least one supplementary response may comprise, for each iteration in the plurality of iterations: performing voice activity detection in the audio upstream within a predetermined duration starting from the previous voice output; if no valid voice input is detected through the voice activity detection, generating a follow-up response based at least on a pseudo input, the pseudo input being generated along with the previous response; and generating a new pseudo input based at least on the voice input. While if a valid voice input is detected through the voice activity detection, the method may stop performing any further iterations.

It should be appreciated that the method 1600 may further comprise any steps/processes for responding in a voice conversation according to the embodiments of the present disclosure as mentioned above.

Figure 17:
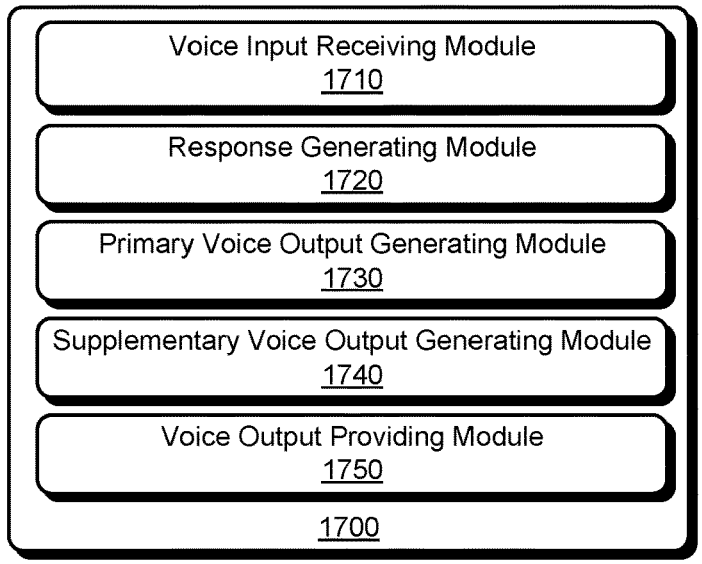
FIG. 17 illustrates an exemplary apparatus for responding in a voice conversation according to an embodiment.

FIG. 17 illustrates an exemplary apparatus 1700 for responding in a voice conversation according to an embodiment.

The apparatus 1700 may comprise: a voice input receiving module 1710, for receiving a voice input in an audio upstream; a response generating module 1720, for generating, in response to the voice input, a primary response and at least one supplementary response; a primary voice output generating module 1730, for generating a primary voice output based on the primary response; a supplementary voice output generating module 1740, for generating at least one supplementary voice output based on the at least one supplementary response; and a voice output providing module 1750, for providing the primary voice output and the at least one supplementary voice output in an audio downstream, wherein the at least one supplementary voice output is provided during a time period adjacent to the primary voice output in the audio downstream.

In an implementation, the time period is between a time point of completing the receiving of the voice input and a time point of providing the primary voice output.

According to the above implementation, the response generating module 1720 may be further for: generating the at least one supplementary response based on at least one padding word, wherein duration of output of the at least one padding word is within duration of the time period with a predetermined probability.

According to the above implementation, the voice input is associated with a task, and the response generating module 1720 may be further for: generating a prediction of the voice input during receiving the voice input; identifying intent of the task based on the prediction; and generating the at least one supplementary response based on the intent of the task.

In an implementation, the time period is between a time point of completing the providing of the primary voice output and a time point of receiving a next voice input. The response generating module 1720 may be further for generating the at least one supplementary response through: generating a set of follow-up responses concurrently with the generating of the primary response; or generating a set of follow-up responses recursively through a plurality of iterations after the generating of the primary response.

Moreover, the apparatus 1700 may also comprise any other modules configured for responding in a voice conversation according to the embodiments of the present disclosure as mentioned above.

Figure 18:
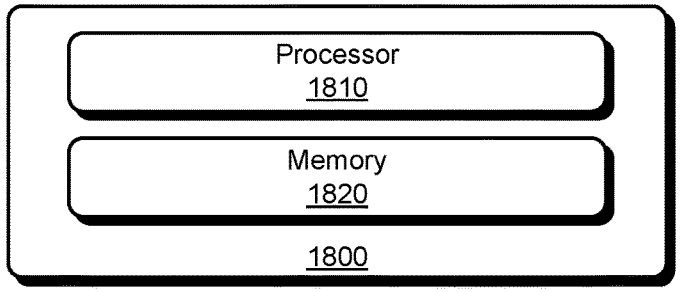
FIG. 18 illustrates an exemplary apparatus for responding in a voice conversation according to an embodiment.

FIG. 18 illustrates an exemplary apparatus 1800 for responding in a voice conversation according to an embodiment.

The apparatus 1800 may comprise at least one processor 1810 and a memory 1820 storing computer-executable instructions. When executing the computer-executable instructions, the at least one processor 1810 may: receive a voice input in an audio upstream; generate, in response to the voice input, a primary response and at least one supplementary response; generate a primary voice output based on the primary response; generate at least one supplementary voice output based on the at least one supplementary response; and provide the primary voice output and the at least one supplementary voice output in an audio downstream, wherein the at least one supplementary voice output is provided during a time period adjacent to the primary voice output in the audio downstream. The at least one processor 1810 may be further configured for performing any operations of the methods for responding in a voice conversation according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for responding in a voice conversation according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein by reference and are intended to be encompassed by the claims.

What is claimed is:

1. A method for responding in a voice conversation by an electronic conversational agent, comprising:
   receiving a voice input in an audio upstream;
   generating a prediction of the voice input during receiving the voice input;
   generating a set of candidate responses using content of the audio upstream;
   establishing a set of processing threads for the set of candidate responses, wherein each processing thread of the set of processing threads corresponds to a candidate response of the set of candidate responses, and wherein the set of processing threads is processed in parallel;
   selecting, from the set of candidate responses, a primary response and at least one supplementary response, wherein the primary response is generated based on the prediction of the voice input and the at least one supplementary response based on at least one padding word;
   generating a primary voice output based on the primary response;
   generating at least one supplementary voice output based on the at least one supplementary response;
   determining that generation of the primary voice output is not complete;
   providing a first supplementary voice output of the at least one supplementary voice output in an audio downstream;
   determining that generation of the primary voice output is complete; and
   providing the primary voice output in the audio downstream, wherein the at least one supplementary voice output is provided during a time period adjacent to the primary voice output in the audio downstream, wherein the time period is between a time point of completing the receiving of the voice input and a time point of providing the primary voice output.

2. The method of claim 1, wherein no valid voice input is received during the time period.

3. The method of claim 1,
   wherein duration of output of the at least one padding word is within duration of the time period with a predetermined probability.

4. The method of claim 1, wherein the voice input is associated with a task, and the generating the at least one supplementary response comprises:
   generating a prediction of the voice input during receiving the voice input;
   identifying intent of the task based on the prediction; and
   generating the at least one supplementary response based on the intent of the task.

5. The method of claim 4, wherein the generating the primary response comprises:
   identifying the intent of the task based on the voice input after completing the receiving of the voice input;
   executing the task based on the intent of the task; and
   generating the primary response based on a result of executing the task.

6. The method of claim 1, wherein the time period is between a time point of completing the providing of the primary voice output and a time point of receiving a next voice input, and further comprising providing a second supplementary voice output of the at least one supplementary voice output in the audio downstream subsequent to the providing of the primary voice output.

7. The method of claim 6, wherein the generating the at least one supplementary response comprises:
generating a set of follow-up responses concurrently with the generating of the primary response.

8. The method of claim 7, wherein the generating the at least one supplementary voice output comprises, for each follow-up response in the set of follow-up responses:
performing voice activity detection in the audio upstream within a predetermined duration starting from a previous voice output; and
if no valid voice input is detected through the voice activity detection, generating a follow-up voice output based on the follow-up response.

9. The method of claim 8, further comprising:
if a valid voice input is detected through the voice activity detection, stopping generating follow-up voice outputs based on the set of follow-up responses.

10. The method of claim 6, wherein the generating the at least one supplementary response comprises:
generating a set of follow-up responses recursively through a plurality of iterations after the generating of the primary response.

11. The method of claim 10, wherein the generating the at least one supplementary response comprises, for each iteration in the plurality of iterations:
performing voice activity detection in the audio upstream within a predetermined duration starting from a previous voice output;
if no valid voice input is detected through the voice activity detection, generating a follow-up response based at least on a pseudo input, the pseudo input being generated along with the previous response; and
generating a new pseudo input based at least on the voice input.

12. The method of claim 11, further comprising:
if a valid voice input is detected through the voice activity detection, stopping performing any further iterations.

13. An apparatus for responding in a voice conversation, comprising:
at least one processor; and
memory comprising instructions that, when executed by the at least one processor, cause the at least one processor to perform operations to:
receive a voice input in an audio upstream;
generate a prediction of the voice input during receiving the voice input;
generate a set of candidate responses using content of the audio upstream;
establish a set of processing threads for the set of candidate responses, wherein each processing thread of the set of processing threads corresponds to a candidate response of the set of candidate responses, and wherein the set of processing threads is processed in parallel;
select, from the set of candidate responses, a primary response and at least one supplementary response, wherein the primary response is generated based on the prediction of the voice input and the at least one supplementary response based on at least one padding word;
generate a primary voice output based on the primary response;
generate at least one supplementary voice output based on the at least one supplementary response;

determine that generation of the primary voice output is not complete;
provide a first supplementary voice output of the at least one supplementary voice output in an audio downstream;
determine that generation of the primary voice output is complete; and
provide the primary voice output in the audio downstream, wherein the at least one supplementary voice output is provided during a time period adjacent to the primary voice output in the audio downstream, wherein the time period is between a time point of completing the receiving of the voice input and a time point of providing the primary voice output.

14. The apparatus of claim 13,
wherein duration of output of the at least one padding word is within duration of the time period with a predetermined probability.

15. The apparatus of claim 13, wherein the voice input is associated with a task, and the memory further comprising instructions that, when executed by the at least one processor, cause the at least one processor to perform operations to:
generate a prediction of the voice input during receiving the voice input;
identify intent of the task based on the prediction; and
generate the at least one supplementary response based on the intent of the task.

16. The apparatus of claim 13, wherein the time period is between a time point of completing the providing of the primary voice output and a time point of receiving a next voice input, and the instructions to generate the at least one supplementary response further comprising instructions to:
generate a set of follow-up responses concurrently with the generating of the primary response; or
generate a set of follow-up responses recursively through a plurality of iterations after the generating of the primary response.

17. At least one non-transitory machine readable medium comprising instructions that, when executed by at least one processor, cause the at least one processor to perform operations to:
receive a voice input in an audio upstream;
generate a prediction of the voice input during receiving the voice input;
generate a set of candidate responses using content of the audio upstream;
establish a set of processing threads for the set of candidate responses, wherein each processing thread of the set of processing threads corresponds to a candidate response of the set of candidate responses, and wherein the set of processing threads is processed in parallel;
select, from the set of candidate responses, a primary response and at least one supplementary response, wherein the primary response is generated based on the prediction of the voice input and the at least one supplementary response based on at least one padding word;
generate a primary voice output based on the primary response;
generate at least one supplementary voice output based on the at least one supplementary response;
determine that generation of the primary voice output is not complete;
provide a first supplementary voice output of the at least one supplementary voice output in an audio downstream;

determine that generation of the primary voice output is complete; and provide the primary voice output in the audio downstream, wherein the at least one supplementary voice output is provided during a time period adjacent to the primary voice output in the audio downstream, wherein the time period is between a time point of completing the receiving of the voice input and a time point of providing the primary voice output.

* * * * *